United States Patent [19]

Suzuki et al.

[11] Patent Number: 5,283,632
[45] Date of Patent: Feb. 1, 1994

[54] IMAGE PICKUP APPARATUS

[75] Inventors: Masao Suzuki, Tokyo; Yasuyuki Yamazaki, Saitama, both of Japan

[73] Assignee: Canon Kabushiki Kaisha, Tokyo, Japan

[21] Appl. No.: 963,936

[22] Filed: Oct. 20, 1992

Related U.S. Application Data

[63] Continuation of Ser. No. 681,560, Apr. 5, 1991.

[30] Foreign Application Priority Data

| Apr. 9, 1990 | [JP] | Japan | 2-92261 |
| Apr. 9, 1990 | [JP] | Japan | 2-92262 |
| Apr. 9, 1990 | [JP] | Japan | 2-92263 |
| Apr. 9, 1990 | [JP] | Japan | 2-92264 |

[51] Int. Cl.⁵ .................... H04N 9/64; H04N 9/04
[52] U.S. Cl. .................................................. 348/223
[58] Field of Search .................. 358/29, 29 C, 28, 27, 358/80, 41, 43, 44, 906, 909, 209, 228; H04N 9/73, 9/73 C, 9/04, 9/64

[56] References Cited

U.S. PATENT DOCUMENTS

| 4,249,197 | 2/1981 | Van Spaandonk et al. | 358/29 C |
| 4,274,107 | 6/1981 | Tamura et al. | 358/29 C |
| 4,525,736 | 6/1985 | Korman | 358/29 C |
| 4,638,350 | 1/1987 | Kato et al. | 358/29 C |
| 4,727,413 | 2/1988 | Miura et al. | 358/29 C |
| 4,811,086 | 3/1989 | Hieda | 358/29 C |
| 5,045,928 | 9/1991 | Takaiwa et al. | 358/41 |
| 5,134,466 | 7/1992 | Taek-hyun | 358/29 |

FOREIGN PATENT DOCUMENTS

| 0221539 | 5/1987 | European Pat. Off. | H04N 9/730 |
| 0176380 | 9/1985 | Japan | 358/29 C |

Primary Examiner—James J. Groody
Assistant Examiner—Michael H. Lee
Attorney, Agent, or Firm—Robin, Blecker, Daley & Driscoll

[57] ABSTRACT

An image pickup apparatus includes a first white balance adjusting circuit for generating a control signal for white balance adjustment by using a signal output from an image pickup element, a second white balance adjusting circuit for generating a control signal for white balance adjustment by using a signal output from a color measure sensor arranged independently of the image pickup element, and a synthesizing circuit for setting and outputting a variable synthesis ratio of the control signals from the two white balance adjusting circuits in accordance with information from an optical system.

17 Claims, 29 Drawing Sheets

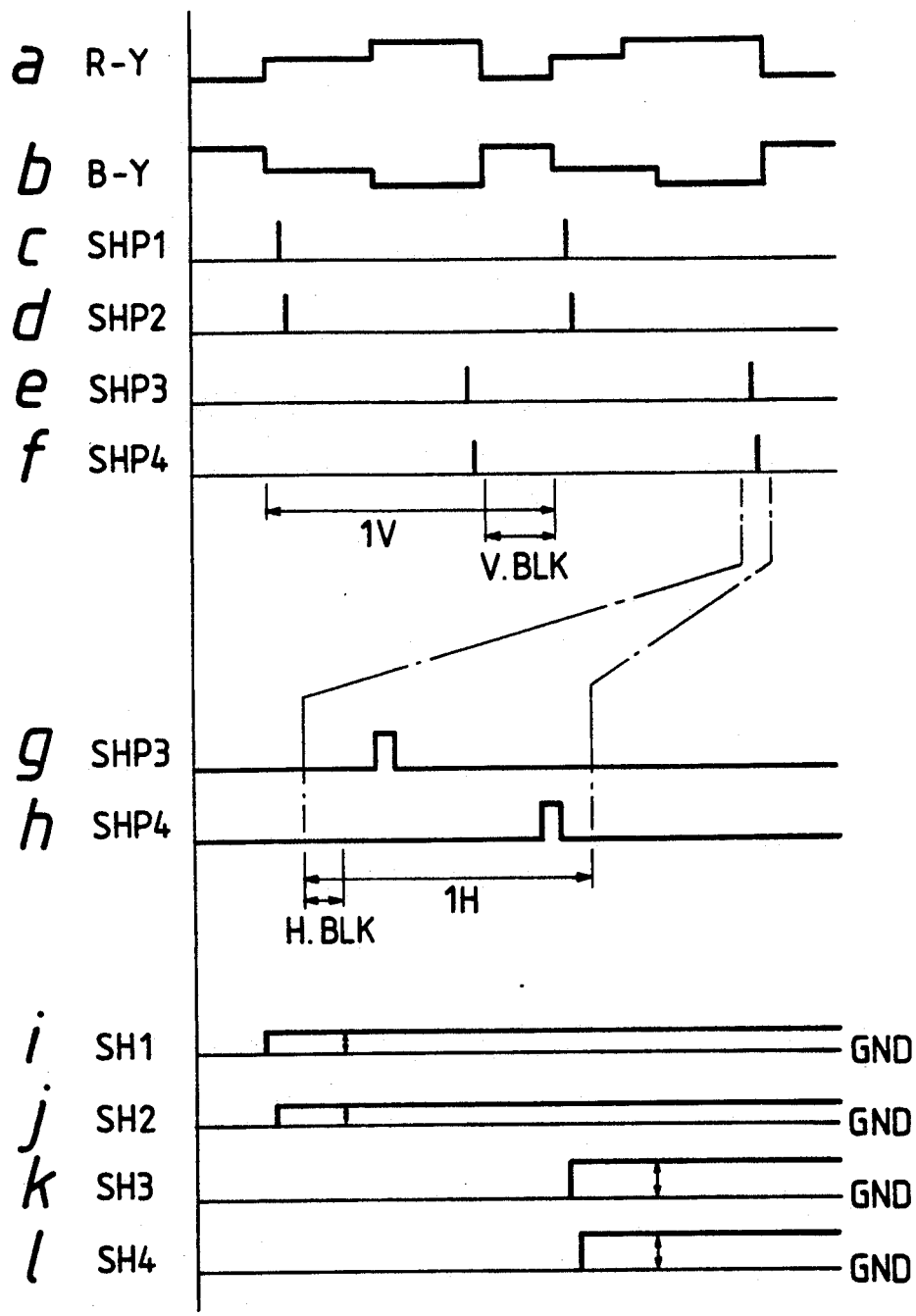

▨ : SAMPLING POINT

IMAGE PICKUP APPARATUS

This is a continuation application under 37CFR 1.62 of prior application Ser. No. 681,560, filed Apr. 5, 1991.

BACKGROUND OF THE INVENTION

1. Field of the Invention

The present invention relates to an image pickup apparatus and, more particularly, to an image pickup apparatus having a white balance adjusting means.

2. Related Background Art

Conventional white balance adjusting devices of image pickup apparatuses are classified into an outer measure mode device for performing white balance adjustment by an output signal from an external color measure sensor shown in FIG. 1 and a through-the-lens (to be referred to as a TTL hereinafter) device for performing white balance adjustment in accordance with an output signal from an image pickup element, as shown in FIG. 2. Conventional examples will be described with reference to FIGS. 1 and 2.

FIG. 1 is a block diagram of a conventional outer measure mode device. This device includes an image pickup optical system 1a, a solid-state image pickup element 1, a luminance signal processing unit 2, a chromaticity signal processing unit (to be referred to as a chrominance signal processing unit hereinafter) 3, R and B gain control units 4 and 5, differential amplifiers 6 and 7, a modulation unit 8, an adder 9, a color temperature sensor 10, and a control signal derivation unit 11. The solid-state image pickup element 1 is an image pickup element for converting optical information into an electric signal. The luminance signal processing unit 2 performs appropriate processing of an output from the image pickup element 1 and derives a luminance signal Y. The chrominance signal processing unit 3 performs appropriate processing of the output from the image pickup element 1 and derives a low-frequency luminance signal $Y_L$ and chrominance signals R and B. The R and B gain control units 4 and 5 control levels of outputs R and B from the chrominance signal processing unit 3 and output signals $R_1$ and $B_1$. The differential amplifier 6 derives a color difference signal R-Y from the luminance signal $Y_L$ and the chrominance signal $R_1$. The differential amplifier 7 derives a color difference signal B-Y from the luminance signal $Y_L$ and the chrominance signal $B_1$. The modulation unit 8 derives a modulation signal defined in NTSC or PAL scheme in accordance with the color difference signals R-Y and B-Y. The adder 9 derives a predetermined video signal from the output Y from the luminance signal processing unit 2 and an output from the modulation unit 8. The color temperature sensor 10 comprises a color measure sensor arranged independently of an image pickup element to measure a color temperature of a light source for illuminating an object. The control voltage derivation unit 11 derives a voltage for controlling amplifier gains of the R and B gain control units 4 and 5 in accordance with an output from the color temperature sensor 10.

An operation of the above circuit arrangement will be described with reference to FIG. 1.

A Y signal is derived by the luminance signal processing unit 2 in accordance with an output from the image pickup element 1, and the $Y_L$, R, and B signals are obtained by the chrominance signal processing unit 3. A color temperature of the light source which illuminates the object is measured by the color temperature sensor 10, and a control voltage to be applied to the R and B gain control units 4 and 5 for correcting white balance is obtained from the control voltage derivation unit 11. The R and B gain control units 4 and 5 output the color signals $R_1$ and $B_1$ whose white balance is corrected. A predetermined video signal having the adjusted white balance is derived from the signals Y, $Y_L$, $R_1$, and $B_1$ through the differential amplifiers 6 and 7, the modulation unit 8, and the adder 9.

FIG. 2 is a block diagram of a conventional TTL mode device. Blocks 1 to 9 correspond to the identical blocks in FIG. 1. Averaging units 12 and 13 comprise low-pass filters for averaging the color differential signals R-Y and B-Y and converting them into DC voltages. In accordance with the average signals from the averaging units 12 and 13, a control voltage derivation unit 14 derives a control voltage applied to the R and B gain control units 4 and 5 for correcting white balance.

An operation of the TTL mode device described above will be described below.

Operations of the blocks 1 to 9 are the same as those in FIG. 1. The R-Y and B-Y signals averaged for one frame or several frames by the averaging units 12 and 13 are compared with a specific voltage corresponding to the zero level of the color difference signals by the control voltage derivation unit 14 so as to determine whether the R-Y and B-Y signals have levels higher or lower than the zero level. The control voltage derivation unit 14 outputs a control level so as to set the R-Y and B-Y levels to be closest to the zero level. This control voltage is input to the R and B gain control units 4 and 5 to adjust the white balance.

Still another conventional system as an addition system which is a combination of the outer measure mode and the TTL mode is available in addition to the above two conventional systems.

FIG. 3 is a block diagram showing this addition system.

Referring to FIG. 3, blocks 1 to 14 identical to those in the conventional arrangements in FIGS. 1 and 2. The control voltage derivation unit 11 is referred to as a first control voltage derivation unit, and the control voltage derivation unit 14 is referred to as the second control voltage derivation unit. Adders 27 and 28 add a control voltage from the first control voltage derivation unit 14 and a control voltage from the second control voltage derivation unit 14 at predetermined ratios. The sum voltages from the adders 27 and 28 are used to adjust the white balance.

In the conventional arrangements, a signal from the image pickup element 1 and a signal from the color temperature sensor serving as a color measure sensor 10 arranged independently of the image pickup element are added at a predetermined ratio to appropriately adjust the white balance.

Still another white balance adjustment scheme is also proposed in Japanese Laid-Open Patent Application No. 63-314424 filed by the present applicant. According to this scheme, one of two color measure methods is selected by a detection output to adjust the white balance.

In the above conventional outer measure mode in FIG. 1, precision of white balance adjustment is greatly degraded when light sources which illuminate an image pickup apparatus body and an object due to large separation of the image pickup apparatus body from the object or when a photographic condition is given as a sunset glow.

In the conventional TTL mode in FIG. 2, when the most of the object area is given as a chromatic color area or when most of the frame is occupied with a monotone, precision of white balance adjustment is degraded because the monotone tends to be corrected to white.

In the addition scheme in FIG. 3, although precision tends to be improved by adding the control voltages derived from the outer measure and TTL modes to each other so as to compensate for drawbacks of these conventional schemes, white balance adjusting effects unique to these conventional schemes are mutually cancel each other to degrade the precision. In the example described in Japanese Laid-Open Patent Application No. 63-314424, this scheme serves as a remedy only when an environmental condition is dark. This scheme is not suitable for white balance adjustment when a scene is bright.

SUMMARY OF THE INVENTION

It is an object of the present invention to provide an image pickup apparatus, based on an inverse proportion between a distance to an object and an influence of a monotonic object color, i.e., domination of a monotone on a frame, wherein appropriate white balance adjustment can be performed in photographic conditions, i.e., both a photographic condition not suitable for the outer measure mode (e.g., a distant view, variations in illumination conditions, back light, and a dark background) and a photographic condition not suitable for the TTL mode (e.g., a monotonic frame or a large influence of an monotonic object color), and at the same time, an appropriate effect, as opposed to cancellation of advantages of both the conventional schemes as in the conventional addition scheme, can be obtained.

In order to achieve the above object according to an aspect of the present invention, there is provided an image pickup apparatus, characterized by comprising first white balance adjusting means for generating a control signal for white balance adjustment by using a signal output from an image pickup element, second white balance adjusting means for generating a control signal for white balance adjustment by using a signal output from a color measure sensor except for the image pickup element, and synthesizing means for setting and outputting a variable synthesis ratio of the control signals from the two white balance adjusting means in accordance with information from an optical system.

With the above arrangement, the first white balance adjusting means performs white balance adjustment by using the signal output from the image pickup element, and the second white balance adjusting means performs white balance adjustment by using the signal output from the color measure sensor arranged independently of the image pickup element. The synthesizing means variably sets the synthesis ratio of the control signals output from the first and second white balance adjusting means. Appropriate white balance adjustment is performed by using one white balance control signal means synthesized by the synthesizing means, thereby performing an image pickup operation.

When distance information from a distance measuring means for measuring a distance between the image pickup apparatus and the object is used as information from an optical system, the control signal from both the white balance adjusting means are synthesized at a predetermined ratio in accordance with the distance information from the distance measuring means for measuring a distance between the image pickup apparatus and the object, thereby performing white balance adjustment.

When information from the optical system is constituted by information of a focal distance (length) from the image pickup optical system, a synthesis ratio of the control signals from both the white balance adjusting means is set variable in accordance with the focal distance information from the image pickup optical system to obtain a single control signal, thereby performing white balance adjustment.

In addition, when information from the optical system is constituted by information from the distance measuring means for measuring the distance between the image pickup apparatus and the object and focal distance information from the image pickup optical system, the control signals from both the white balance adjusting means are synthesized by these pieces of information to obtain a single control signal, thereby appropriately performing white balance.

It is another object of the present invention to provide an image pickup apparatus, based on the fact that when a color signal ratio such as an R/B is close to 1, a monotonic frame is not predominant due to the presence of all color components, i.e., a monotonic component is not predominant on a frame, wherein appropriate white balance adjustment can be performed in photographic conditions, i.e., both a photographic condition not suitable for the outer measure mode (e.g., a distant view, variations in illumination conditions, back light, and a dark background) and a photographic condition not suitable for the TTL mode (e.g., a monotonic frame or a large influence of an monotonic object color), and at the same time, an appropriate effect, as opposed to cancellation of advantages of both the conventional schemes as in the conventional addition scheme, can be obtained.

In order to achieve the above object according to another aspect of the present invention, there is provided an image pickup apparatus, characterized by comprising first white balance adjusting means for generating a control signal for white balance adjustment by using a signal output from an image pickup element, second white balance adjusting means for generating a control signal for white balance adjustment by using a signal output from a color measure sensor arranged independently of the image pickup element, and synthesizing means for comparing a color measure information ratio from the image pickup element with a color measure information ratio from the color measure sensor and setting and outputting a variable synthesis ratio of the control signals from the two white balance adjusting means, an image pickup apparatus further comprising a warning device for generating a photographic warning signal in addition to the above means, or an image pickup apparatus further comprising memory means for storing the white balance control voltages from the first and second white balance adjusting means in addition to the above means, thereby performing white balance adjustment by using the stored white balance control voltages.

With the above arrangement, the first white balance adjusting means performs white balance adjustment by using the signal output from the image pickup element, and the second white balance adjusting means performs white balance adjustment by using the signal output from the color measure sensor arranged independently of the image pickup element. The synthesizing means compares the color measure information ratio from the image pickup element with the color measure information ratio from the color measure sensor and variably sets the synthesis ratio of the control signals output from the first and second white balance adjusting means. Appropriate white balance adjustment is performed by using one white balance control signal synthesized by the synthesizing means, thereby performing an image pickup operation.

In the arrangement additionally including the warning device for generating a photographic warning signal, a photographic warning signal is generated when white balance adjustment is not appropriately performed.

In the arrangement additionally including the memory means for storing the white balance control voltages of the first and second white balance adjusting means, appropriate white balance adjustment is performed by the stored white balance control voltages.

It is still another object of the present invention to provide an image pickup apparatus, wherein the conventional problems described above are solved, appropriate white balance adjustment can be performed in photographic conditions, i.e., both a photographic condition not suitable for the outer measure mode (e.g., a distant view, variations in illumination conditions, back light, and a dark background) and a photographic condition not suitable for the TTL mode (e.g., a monotonic frame or a large influence of an monotonic object color), and at the same time, an appropriate effect, as opposed to cancellation of advantages of both the conventional schemes as in the conventional addition scheme, can be obtained.

In order to achieve the above object according to still another aspect of the present invention, there is provided an image pickup apparatus characterized by comprising first white balance adjusting means for generating a control signal for white balance adjustment by using a signal output from an image pickup element, second white balance adjusting means for generating a control signal for white balance adjustment by using a signal output from a color measure sensor, and synthesizing means for variably setting a synthesis ratio of the control signals in accordance with a difference between the signal output from the image pickup element or a signal equivalent thereto and the signal output from the color measure sensor.

In order to achieve the above object according to still another aspect of the present invention, there is provided an image pickup apparatus characterized by comprising first white balance adjusting means for generating a control signal for white balance adjustment by using a signal output from an image pickup element, second white balance adjusting means for generating a control signal for white balance adjustment by using a signal output from a color measure sensor having a frame angle different from an image pickup angle of an image pickup optical system, and synthesizing means for comparing an output from photometric means different from the color measure sensor with the output from the color measure sensor and for variably outputting the two control signals.

With the above arrangement, the synthesis ratio of the control signal for white balance adjustment from the first white balance adjusting means and the control signal for white balance adjusting means from the second white balance adjusting means are variably set by the synthesizing means in accordance with a difference between the signal output from the image pickup element or the signal equivalent thereto and the signal output from the color measure sensor, thereby obtaining a single control signal for white balance adjustment. By using this control signal, appropriate white balance adjustment is performed, and an image pickup operation is performed.

A large difference between the control signals indicates a large difference between a photographic condition in the image pickup element, e.g., object brightness and a photographic condition in the color measure sensor. By utilizing this comparison result, a white balance adjustment control signal is generated, and more accurate white balance control is realized.

In order to achieve the above object according to still another aspect of the present invention, there is provided an image pickup apparatus for performing white balance adjustment using image pickup outputs from an image pickup element, characterized by comprising control means for comparing the image pickup outputs at predetermined positions on a frame upon sampling of the outputs from the image pickup elements, and performing white balance adjustment in accordance with a comparison result.

In order to achieve the above object according to still another aspect of the present invention, there is provided an image pickup apparatus characterized by comprising first white balance adjusting means for generating a white balance control signal for white balance adjustment by using a signal output from an image pickup element, second white balance adjusting means for generating a white balance control signal for white balance adjustment by using a signal output from a color measure sensor arranged independently of the image pickup element, and synthesizing means for comparing signals of predetermined positions on a frame upon sampling of signals output from at least the image pickup element and mixing the white balance control signals from the first and second white balance adjusting means at a predetermined ratio in accordance with a comparison result.

With the above arrangement, the image pickup outputs of the predetermine positions on the frame upon sampling of the image pickup outputs from the image pickup element are compared with each other, and white balance adjustment is performed on the basis of the comparison result, thereby performing an image pickup operation.

The first white balance adjusting means generates the white balance control signal for white balance adjustment by using the signal output from the image pickup element, and the second white balance adjusting means generates the white balance control signal for white balance adjustment by using the signal output from the color measure sensor arranged independently of the image pickup element. The synthesizing means compares the signals of predetermined positions on the frame upon sampling of the signals output from at least image pickup element and mixes the white balance control signals from the two white balance adjusting means at the predetermined ratio in accordance with the comparison result, thereby performing white balance adjustment in accordance with the mixed output, thereby performing an image pickup operation.

The image pickup operation with an appropriate white balance level obtained by the above white balance adjustment can be performed.

When a warning device for generating a photographic warning signal is provided, an image warning signal is generated in accordance with an image pickup condition.

In addition, when a memory means for storing white balance control voltages is provided, appropriate white balance adjustment is performed by the stored white balance control voltages in accordance with the image pickup condition, thereby performing an appropriate image pickup operation.

The above and other objects, features, and advantages of the present invention will be apparent from the following detailed description in conjunction with the accompanying drawings.

BRIEF DESCRIPTION OF THE DRAWINGS

FIG. 24 is a timing chart of the twenty-fourth embodiment;

DETAILED DESCRIPTION OF THE PREFERRED EMBODIMENTS

Figure 4:
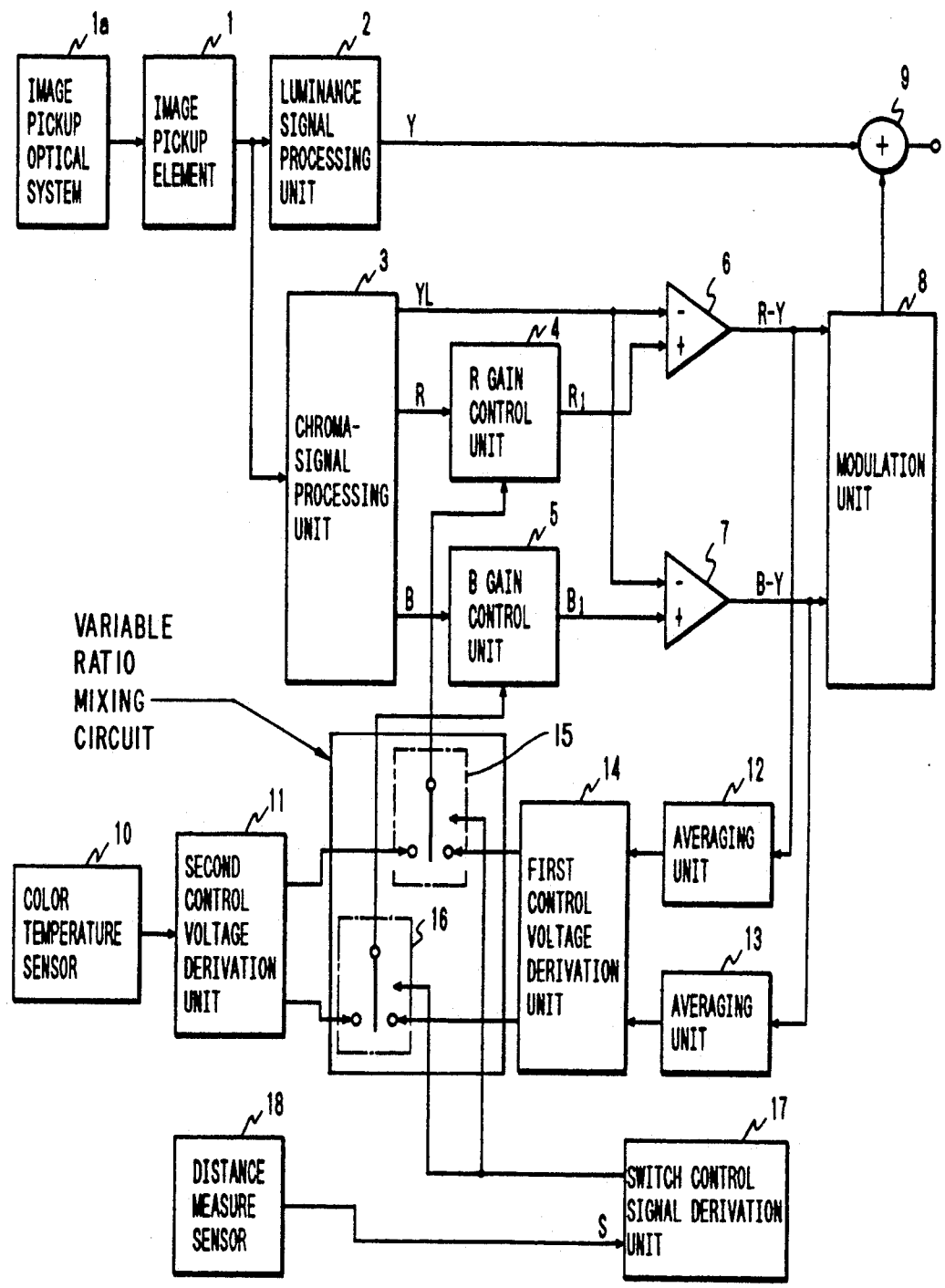
FIG. 4 is a block diagram showing the first embodiment of the present invention.

FIG. 4 is a block diagram showing an image pickup apparatus according to the first embodiment of the present invention. Blocks 1 to 14 correspond to blocks denoted by the same reference numerals as in the conventional arrangements. Image pickup light of an object is illuminated on an image pickup element 1 through an image pickup optical system 1a. In this embodiment, switches 15 and 16 comprises a variable ratio mixing circuit and select one of control voltages output from the first control voltage derivation unit 14 and the second control voltage derivation unit 11 and supply the selected control voltage to the R and B gain control units 4 and 5. That is, a synthesis ratio is given as 0:100%. A switch control signal derivation unit 17 derives a control signal for switching the switches 15 and 16. A distance measure sensor 18 serves as an optical system or generating distance information to the switch control signal derivation unit 17.

An operation of the first embodiment will be described with reference to FIG. 4.

Figure 1:
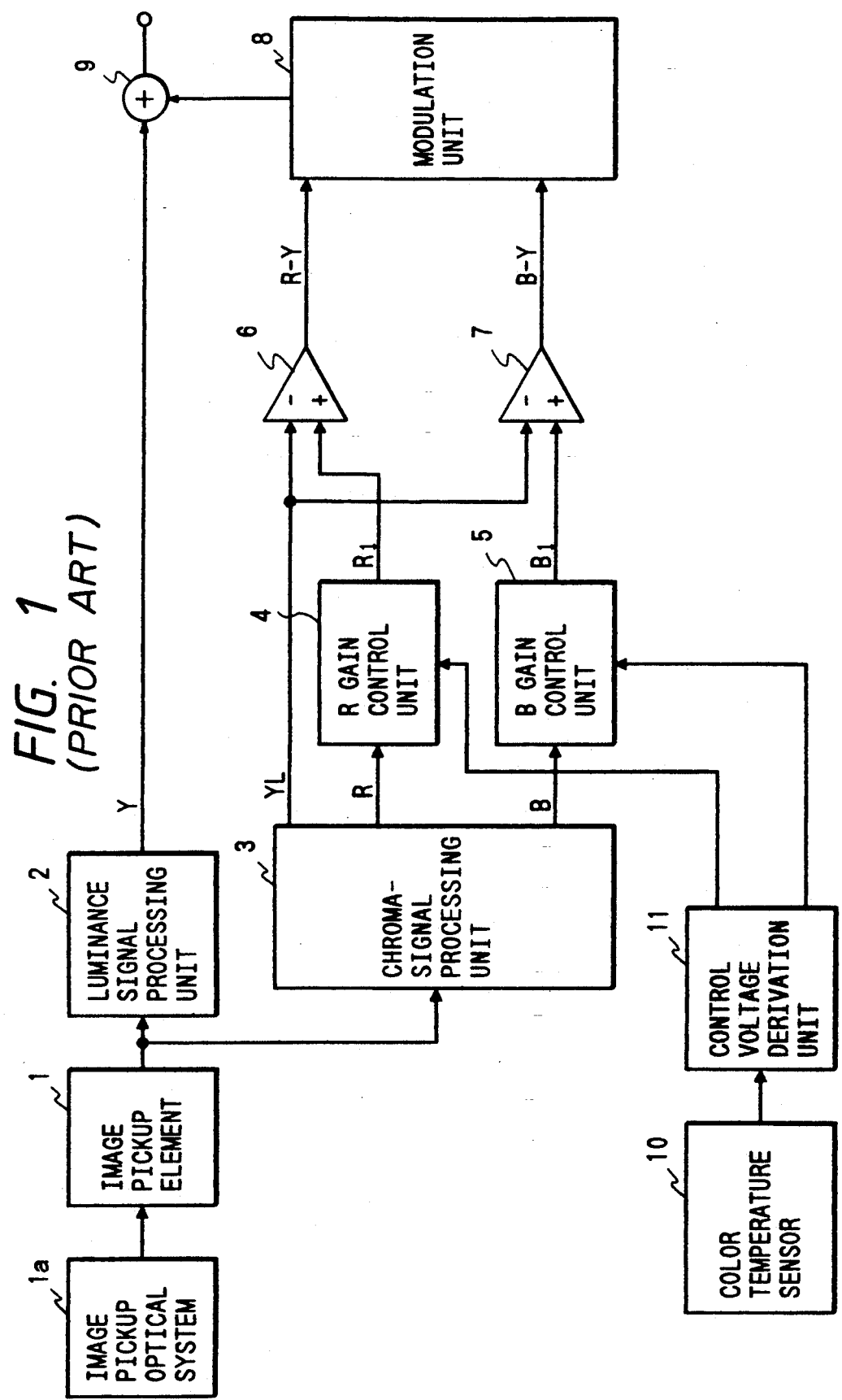
FIGS. 1 to 3 are block diagrams showing conventional arrangements, respectively.
Figure 2:
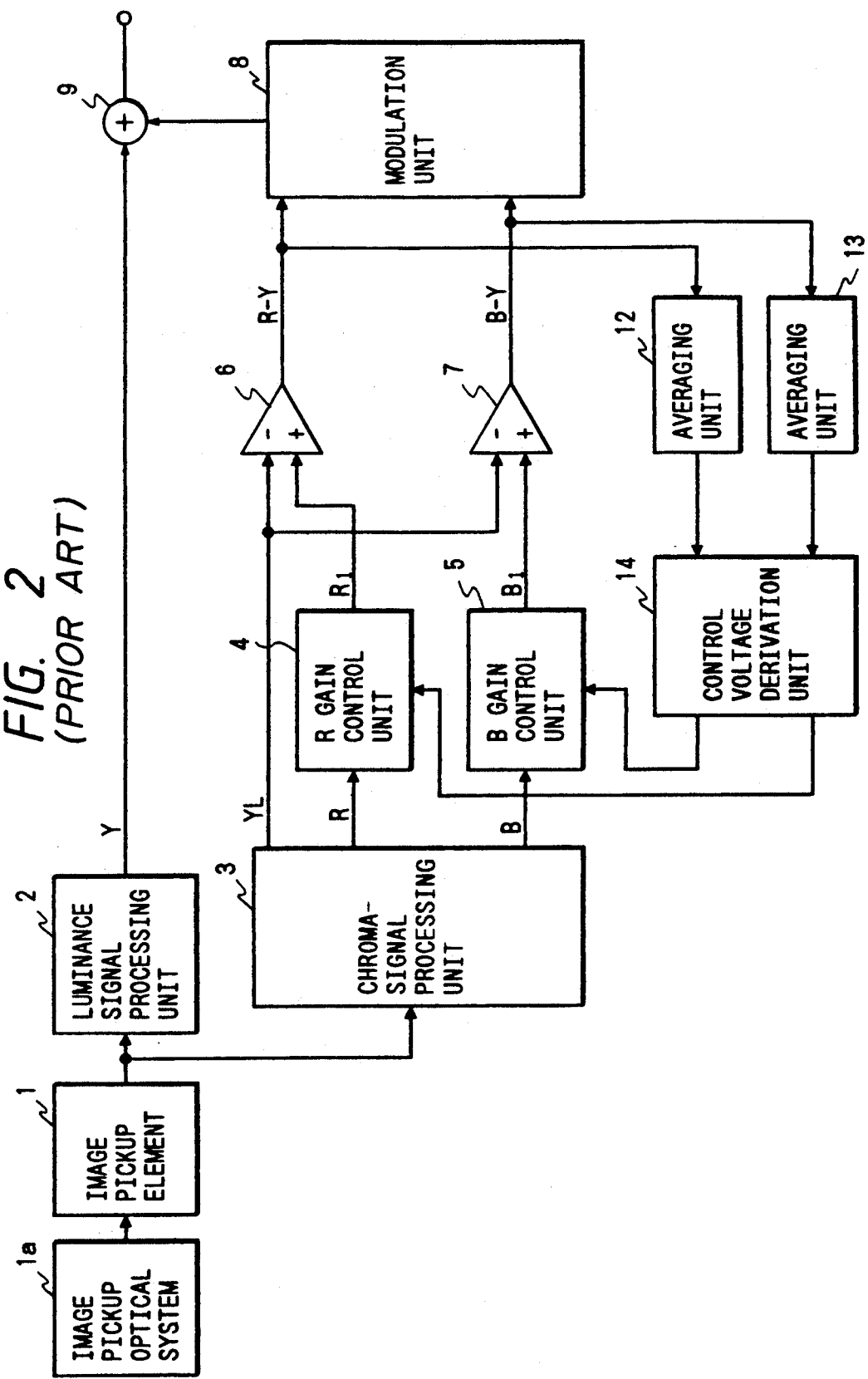
Figure 3:
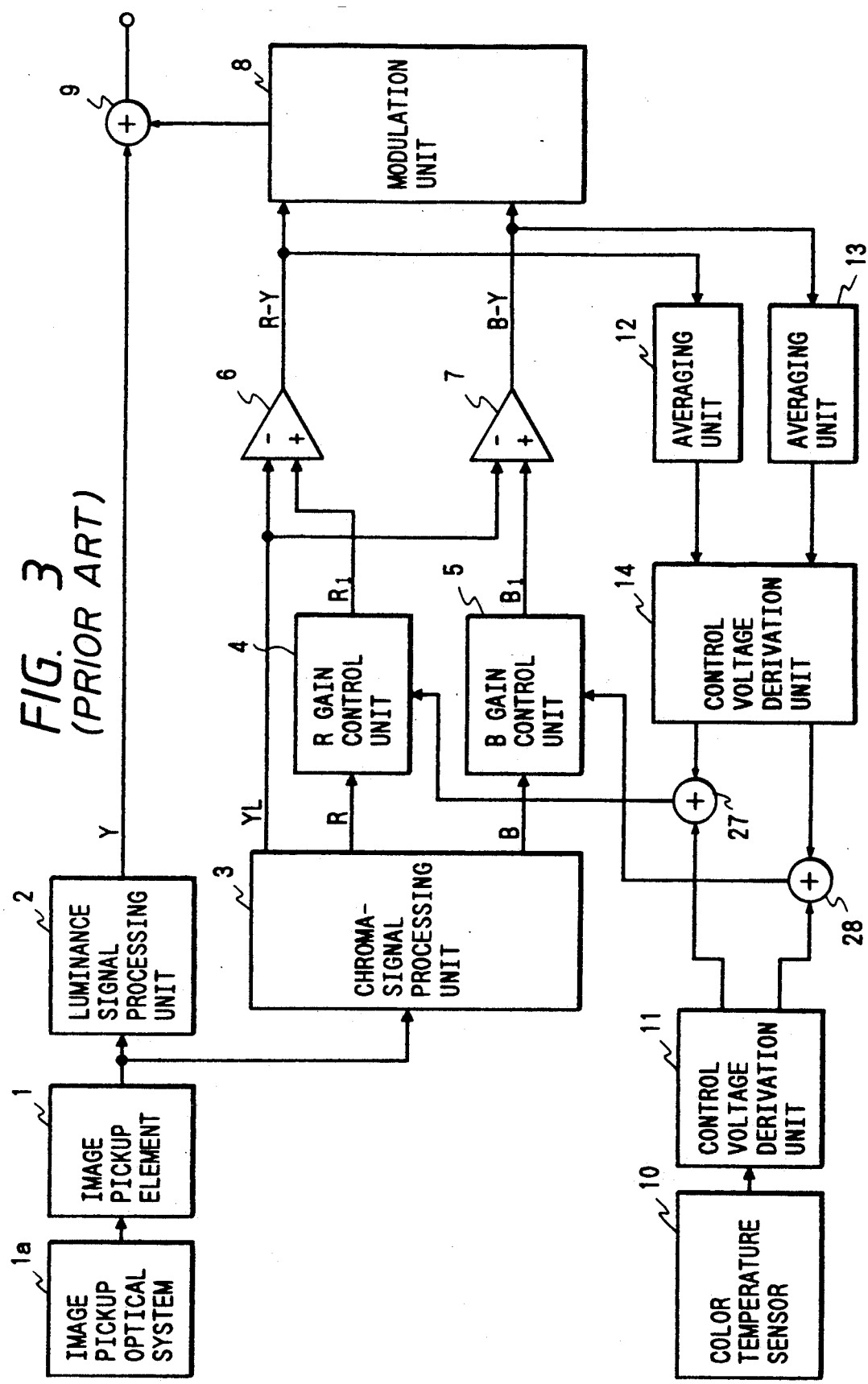

Referring to FIG. 4, the operations of the blocks 1 to 14 are the same as those in the conventional arrangements of FIGS. 1, 2, and 3. One of the control voltages output from the first control voltage derivation unit 14 and the second control voltage derivation unit 15 is selected by the switches 15 and 16, and the selected control voltage is supplied to the R and B gain control units 4 and 5. In this case, a switching control signal for the switches 15 and 16 is derived from the switch control signal derivation unit 17. The distance measure sensor 18 measures a distance between the object and the image pickup apparatus and outputs a voltage value proportional to the distance. The switch control signal derivation unit 17 determines whether the measured distance is longer than a predetermined distance. If not, the switch control signal derivation unit 17 outputs a control signal so as to switch the switches 15 and 16 to an outer measure mode side, i.e., the second control voltage derivation unit 11 side. Otherwise, the switch control signal derivation unit 17 generates a control signal to switch the switches 15 and 16 to a TTL mode side, i.e., the first control voltage derivation unit 14 side.

Figure 5:
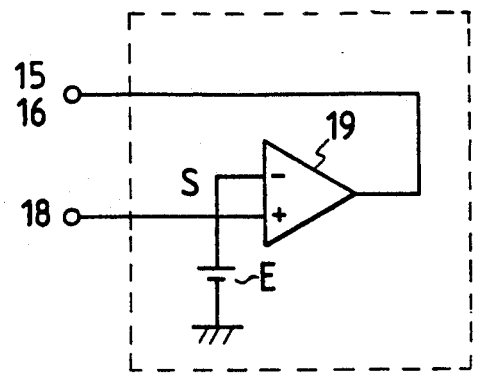
FIG. 5 is a block diagram showing a switch control signal derivation unit of the first embodiment.

FIG. 5 shows a detailed arrangement of the switch control signal derivation unit 17 which includes a comparator 19.

When an output S from the distance measure sensor 18 is larger than a specific level E, a long distance is indicated. A signal of high level is supplied to the control unit for the switches 15 and 16 to set the switches 15 and 16 to the TTL mode side, i.e., the first control voltage derivation unit 14 side. However, when the output S is smaller than the level E, a short distance is indicated, so that a signal of low level is sent to set the switches 15 and 16 to the outer measure mode side, i.e., the second control voltage derivation unit 11 side.

The image pickup element 1, the averaging units 12 and 13 using the signal output from the image pickup element 1, and the first control voltage derivation unit 14 constitute a first white balance adjusting means. The color temperature sensor 10 serving as a color measure sensor except for the image pickup element, and the second control voltage derivation unit 11 constitute a second white balance adjusting means. The switch control signal derivation unit 17 and the switches 15 and 16 constitute a synthesizing means.

With the above arrangement and operation, when an object is far away, i.e., when an influence of an object color is small, the TTL mode is set by the first white balance adjusting means which is not suitable for white balance control of a monotonic frame. However, when the object is close, i.e., when an influence of the object color is large, the outer measure mode is set by the second white balance adjusting means, thereby performing appropriate white balance adjustment.

Since the distance measure sensor 18 is arranged in addition to the image pickup optical system 1a, distance information can be obtained without complicating the image pickup optical system 1a. In this manner, both the white balance adjusting means can be selectively used.

In this embodiment, the switches 15 and 16 for switching the synthesis ratio between 0% and 100% are used as the synthesizing means in the present invention. However, a mixer for changing the synthesis ratio continuously or stepwise in accordance with the distance information may be used. In this case, white balance control based on a higher precision control signal can be performed.

Figure 6:
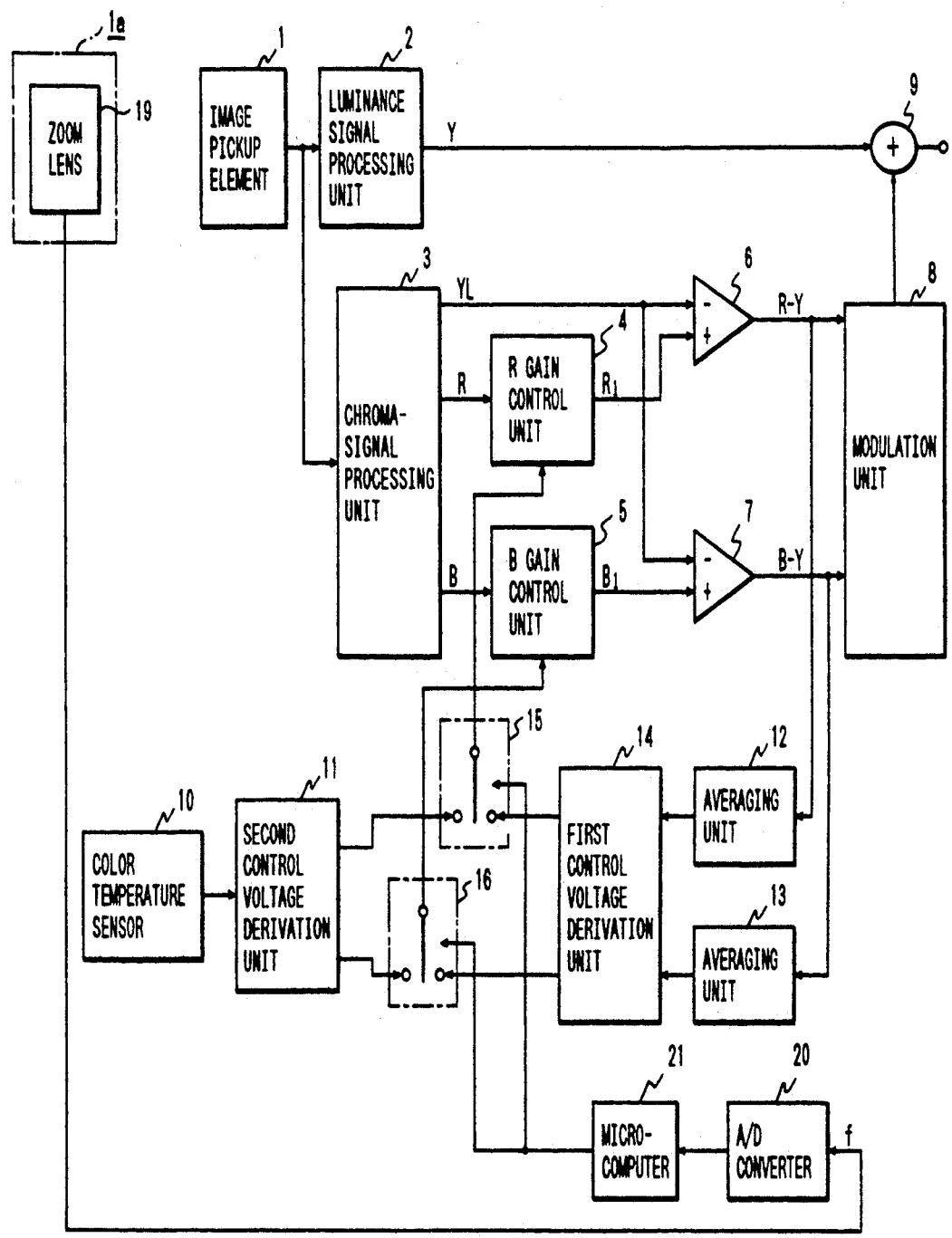
FIG. 6 is a block diagram showing the second embodiment.

FIG. 6 is a block diagram of an image pickup apparatus according to the second embodiment of the present invention. Blocks 1a and 1 to 16 correspond to blocks denoted by the same reference numerals as in the conventional arrangement of FIG. 1. A block 19 outputs distance information f between a zoom lens in the image pickup optical system 1a and its focal distance, i.e., between the lens corresponding to the object and the image forming point. The image pickup apparatus of this embodiment also includes an A/D converter 20 and a micro-computer 21.

In the second embodiment, focal distance information from a zoom lens system serving as an optical system is input to the A/D converter 20 and the micro-computer 21 in place of the distance information from the distance measure sensor of the first embodiment, thereby deriving a switch switching control signal.

More specifically, when the focal distance is increased and the focal distance information f exceeds a predetermined level ($f_s$), a monotonic object color is spread on the entire frame, and a control signal is output from the micro-computer 21 so that the switches 15 and 16 are connected to the outer measure mode side. Otherwise, a control signal is output from the micro-computer 21 so that the switches 15 and 16 are set on the TTL mode side. As a result, appropriate white balance adjustment can be performed by appropriate switching as in the first embodiment.

Figure 7:
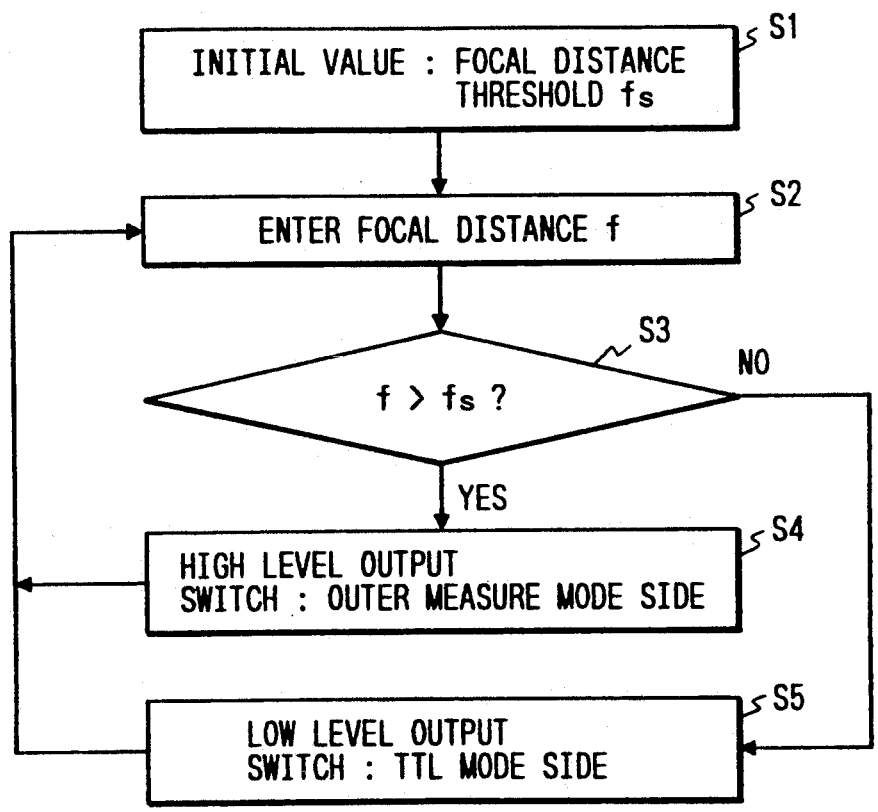
FIG. 7 is a flow chart for explaining the second embodiment.

A detailed operation of this embodiment will be described with reference to a flow chart in FIG. 7.

In step S1, a specific value, i.e., a threshold $f_s$ of the focal distance information f is set. In step S2, focal distance information f is input from the zoom lens block 19 and is A/D-converted, thereby fetching digital data in the micro-computer 21.

In step S3, the focal distance information f is compared with the threshold $f_s$. If condition $f > f_s$ is established, a signal of high level is output to the switches 15 and 16 to select the outer measure mode side in step S4.

However, if condition $f \leq f_s$ is established, a signal of low level is output to the switches 15 and 16 to select a TTL mode side in step S5.

The circuit blocks of the first and second white balance adjusting means are the same as those in the first embodiment. The micro-computer 21 and the switches 15 and 16 constitute a selecting means. In place of the distance measure sensor of the first embodiment, the first and second white balance adjusting means are selectively used in accordance with information from an optical system i.e., the zoom lens serving as an image pickup lens or the means interlocked with the image pickup lens. The focal distance of the image pickup zoom lens is increased, and appropriate white balance adjustment can be performed even if the frame is formed by a monotone.

Figure 8:
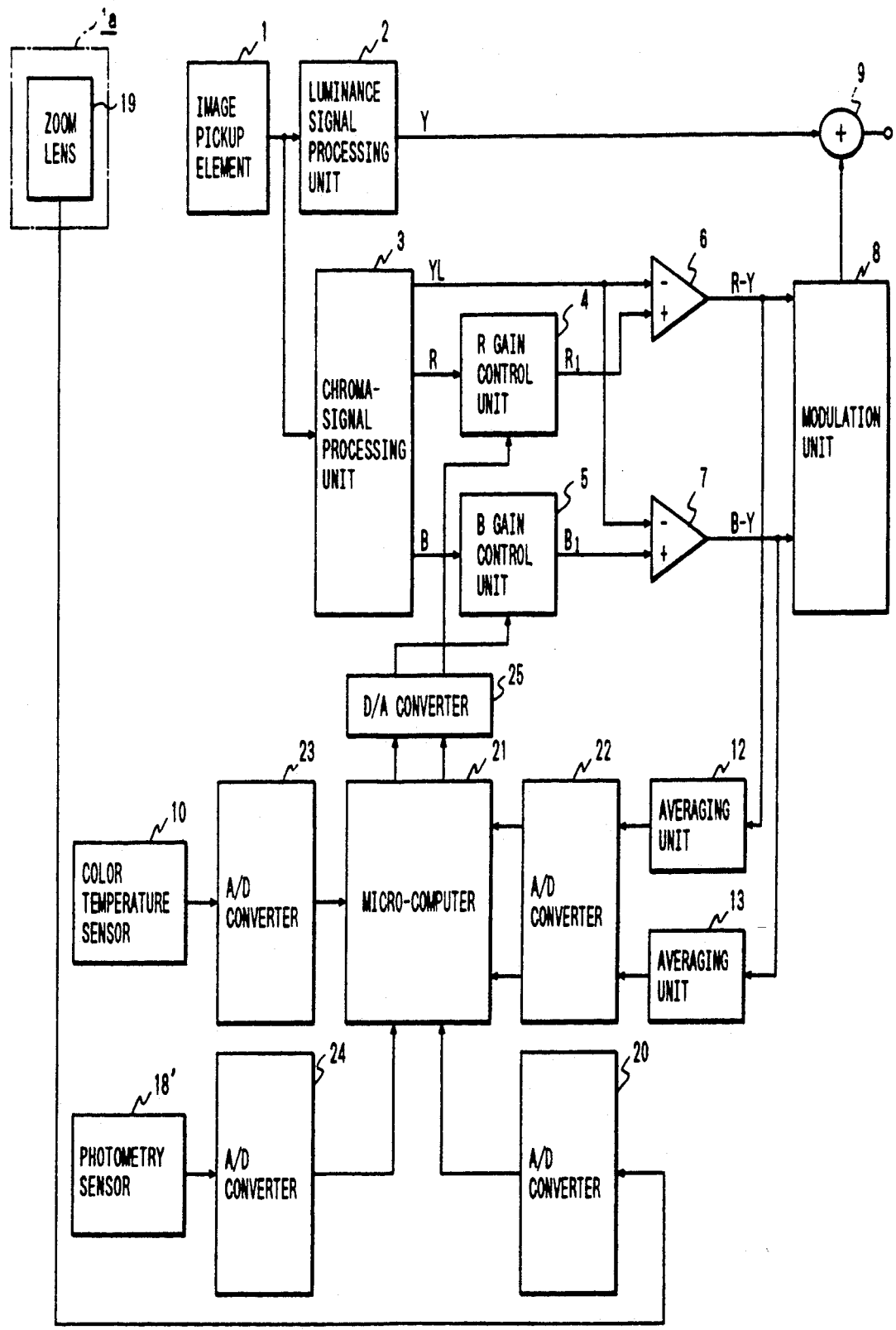
FIG. 8 is a block diagram showing the third embodiment of the present invention.

FIG. 8 is a block diagram showing the third embodiment. Blocks 1a, 1 to 10, 12, 13, and 18 to 21 correspond to blocks denoted by the reference numerals 18–21 as in the first and second embodiments. An image pickup apparatus of the third embodiment also includes A/D converters 22, 23, and 24, and a D/A converter 25.

Figure 9:
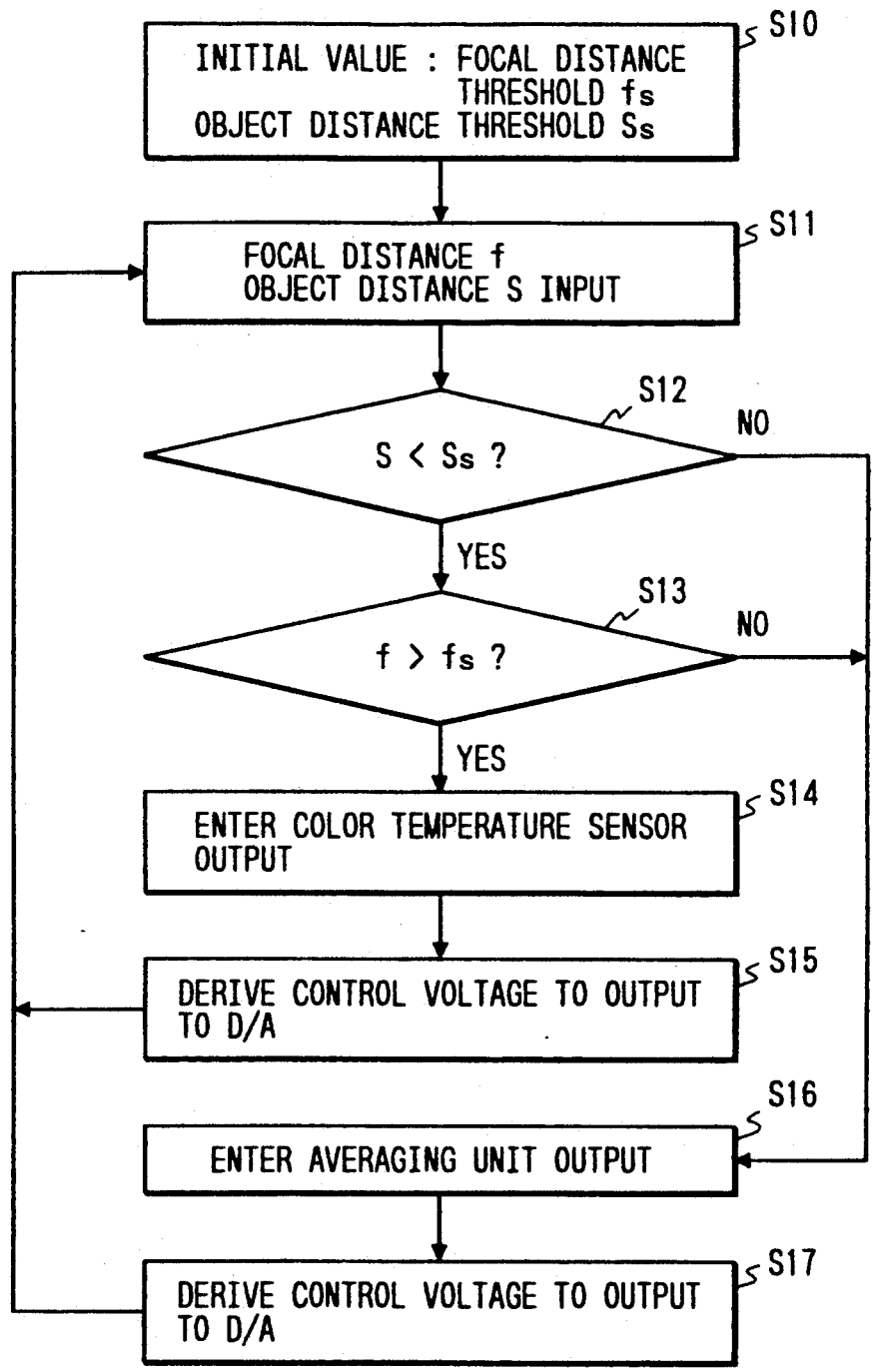
FIG. 9 is a flow chart for explaining the third embodiment.

An operation of this embodiment will be described in detail with reference to a flow chart in FIG. 9, centered on the operation of the micro-computer 21.

Threshold values ($f_s$ and $s_s$) of the focal distance and the object distance are set as shown in step S10. The focal distance f and the object distance s are A/D-converted by the A/D converters 20 and 24 in a photographic state in step S11. The converted digital data are fetched by the micro-computer 21. In steps S12 and S13, the object distance s and its threshold $s_s$ and the focal distance f and its threshold $f_s$ are compared with each other, respectively. If conditions $s < s_s$ and $f > f_s$ are established, the flow advances to step S14. Otherwise, the flow advances to step S15. In step S14, a value obtained by A/D-converting an output from the color temperature sensor 10 by the A/D converter 23 is input to the micro-computer 21. The flow then advances to step S15, and a control voltage is derived from the input value and is output to the D/A converter 25 (step S15).

In step S16, values obtained by A/D-converting the outputs from the averaging units 12 and 13 by the A/D converter 22 are input to the micro-computer 21 to derive a control voltage from the input values. The control signal is input to the D/A converter 25 (step S17). An analog control voltage is output from the D/A converter 25 to the R and B gain control units 4 and 5, thereby performing white balance adjustment.

The first and second white balance adjusting means are substantially the same as those in the first embodiment except that the A/D converters 22 and 23 are added in place of the first and second control voltage derivation units 14 and 11. The micro-computer 21 constitutes a synthesizing means.

A white balance scheme is determined in accordance with the focal distance information from the image pickup optical system and the object distance information from the optical means to select the first or second white balance adjusting means. More appropriate white balance adjustment can be performed.

In this embodiment, only when the object distance s and the focal distance f exceed threshold values (threshold levels), the outer measure mode is set. However, the mode may be switched by preferentially taking one of the object distance s and the focal distance f. In this case, an image adjusted to satisfy a photographer's need is obtained.

Figure 10:
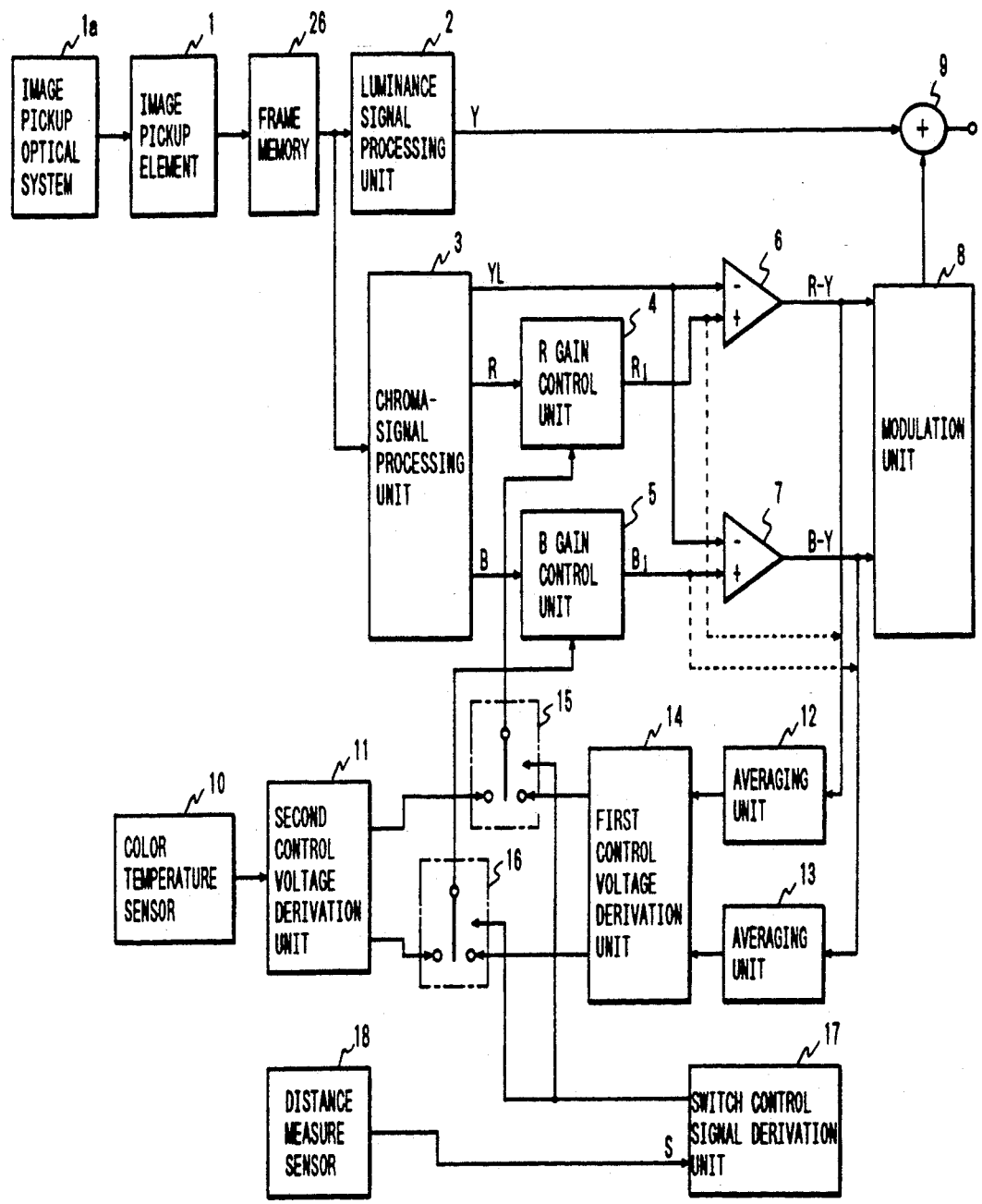
FIG. 10 is a block diagram showing the fourth embodiment of the present invention.

In each embodiment described above, predetermined processing is directly performed for an output from the image pickup element 1. However, an output from the image pickup element 1 is stored in an image memory as a frame memory 26 shown in FIG. 10 once, and the predetermined processing may be performed for an output from the image memory. In this case, processing in units of frames can be easily performed, and precision can be expected to be improved.

In the above embodiment, R-Y and B-Y signals of the chrominance signals are obtained as signals from the image pickup element used in the first white balance adjusting means. However, as the fifth embodiment, chrominance signals R, G, and B may be used in place of the color difference signals. In this case, a further improvement of a white balance adjustment effect can be achieved. As indicated by a broken line in FIG. 7, the chrominance signals R and B are extracted from the R and B gain control units 4 and 5.

In the above embodiment, a control signal is obtained as a signal used in the first white balance adjusting means by averaging the chrominance signals on the entire frame in the TTL mode. In the sixth embodiment, however, another method of obtaining a control signal by utilizing only chrominance signals of high-luminance components may be utilized.

In the above embodiment, the first or second white balance adjusting means is selected to obtain a control voltage of a TTL or outer measure mode. In the seventh embodiment, however, an average value or a value close to the average value of the control voltages of both the modes may be used near a switching threshold in consideration of both the control voltages, thereby gradually changing the control voltages. In this case, a more stable image pickup operation can be performed with a value close to the threshold value.

As the eighth embodiment, hysteresis characteristics may be provided to the optical system information level determining means (i.e., a comparator and micro-computer comparison operations) to prevent an unstable operation near the threshold value (threshold level). In this case, a stabler image pickup operation can be performed with a value close to the threshold value.

Distance measure information in the ninth embodiment may be obtained by a means for detecting an in-focus position in accordance with an output signal from an image pickup element.

In each embodiment, as described above, the synthesis ratio of the control signal output from the first white balance adjusting means on the basis of the signal output from the image pickup element and the control signal output from the second white balance adjusting means on the basis of the signal output from the color measure sensor arranged independently of the image pickup element is variably controlled in accordance with the information from the optical system, and the white balance adjustment is performed on the basis of the variable output. There is, therefore, provided an image pickup apparatus wherein appropriate white balance adjustment can be performed in photographic conditions, i.e., both a photographic condition not suitable for the outer measure mode (e.g., a distant view, variations in illumination conditions, back light, and a dark background) and a photographic condition not suitable for the TTL mode (e.g., a monotonic frame or a large influence of an monotonic object color), and at the same time, an appropriate effect, as opposed to cancellation of advantages of both the conventional schemes as in the conventional addition scheme, can be obtained.

According to the present invention, when the synthesis ratio of the white balance control signals is variably controlled in accordance with, particularly, distance information, this distance information can be obtained by a general auto-focus means. The distance measure means need not be separately arranged for only white balance. Therefore, a compact apparatus as a whole and effective utilization of the auto-focus means can be achieved.

When the distance information is obtained from the optical means for measuring a distance between the image pickup apparatus and the object, the distance information can be obtained without complicating the image pickup optical system. The control signals from both the white balance adjusting means can be appropriately variably adjusted by the distance information, so that appropriate white balance adjustment can be performed.

When the distance information is constituted by the focal distance information from the image pickup optical system, the focal distance of the zoom lens of the image pickup optical system is increased, and the entire frame is formed by a monotone, the second white balance adjusting means is operated. Otherwise, the first white balance adjusting means is operated, thereby always performing appropriate white balance adjustment.

When the distance information is obtained from information from an optical means for measuring a distance between the image pickup apparatus and the object and focal distance information from the image pickup optical system, there is provided an image pickup apparatus capable of performing appropriate white balance adjustment so as to include the effects of the above arrangement.

According to this embodiment, since the distance information is utilized, it is possible to solely detect regardless of brightness and colors of the object whether a frame is formed by a monotonic frame, thereby accurately performing white balance control.

Figure 11:
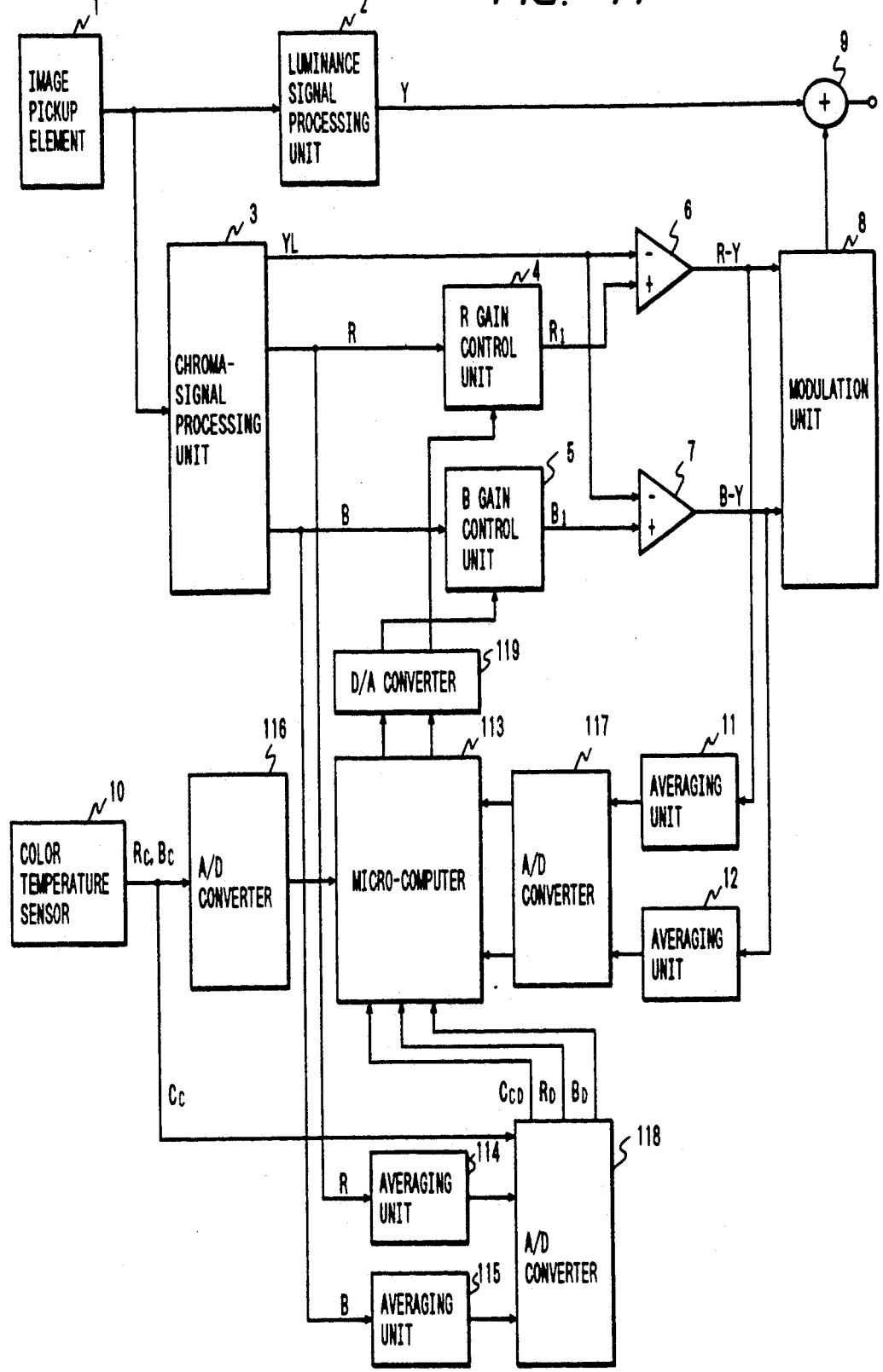
FIG. 11 is a block diagram showing the tenth embodiment of the present invention.
Figure 12:
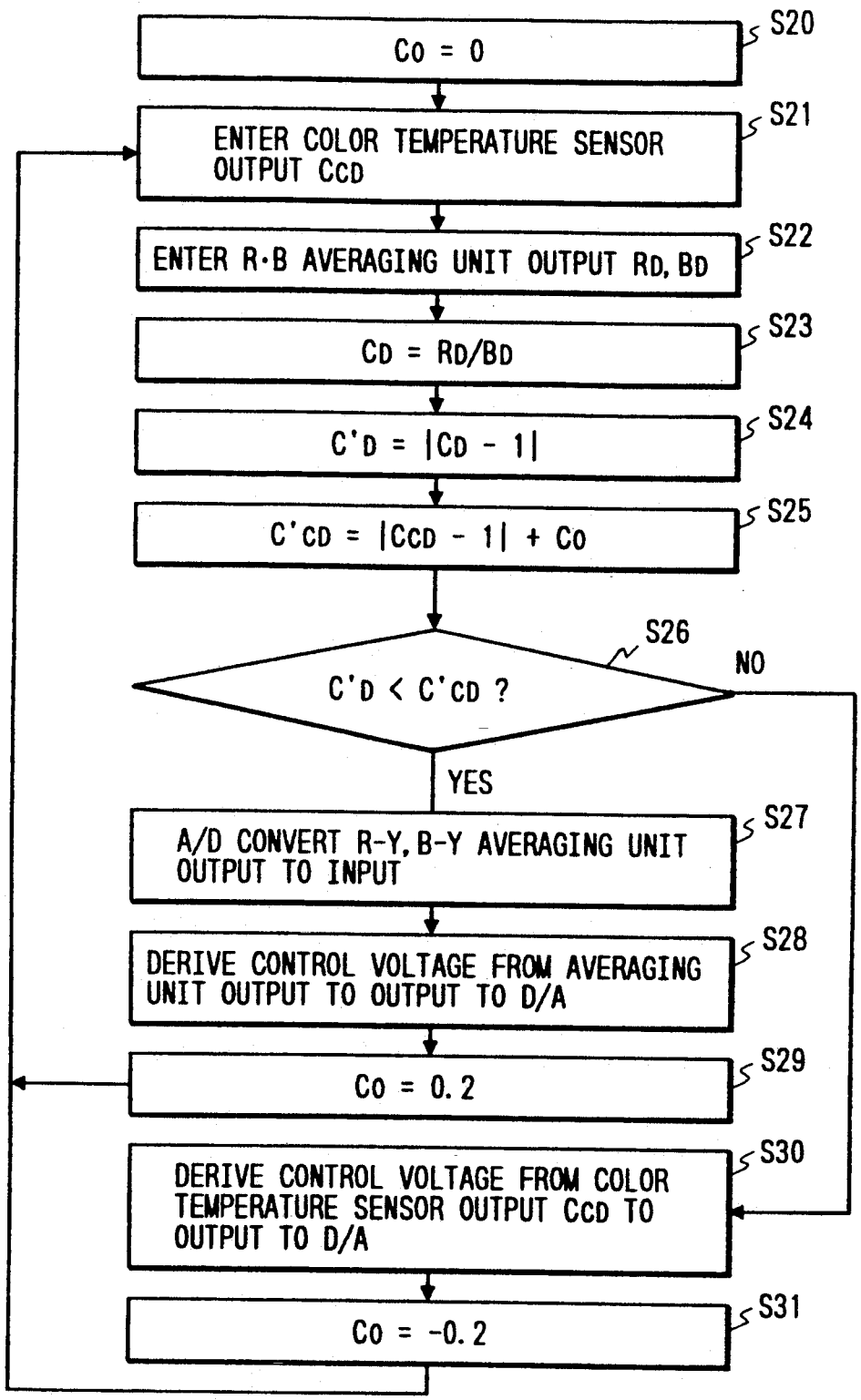
FIG. 12 is a flow chart for explaining the tenth embodiment.
Figure 13:
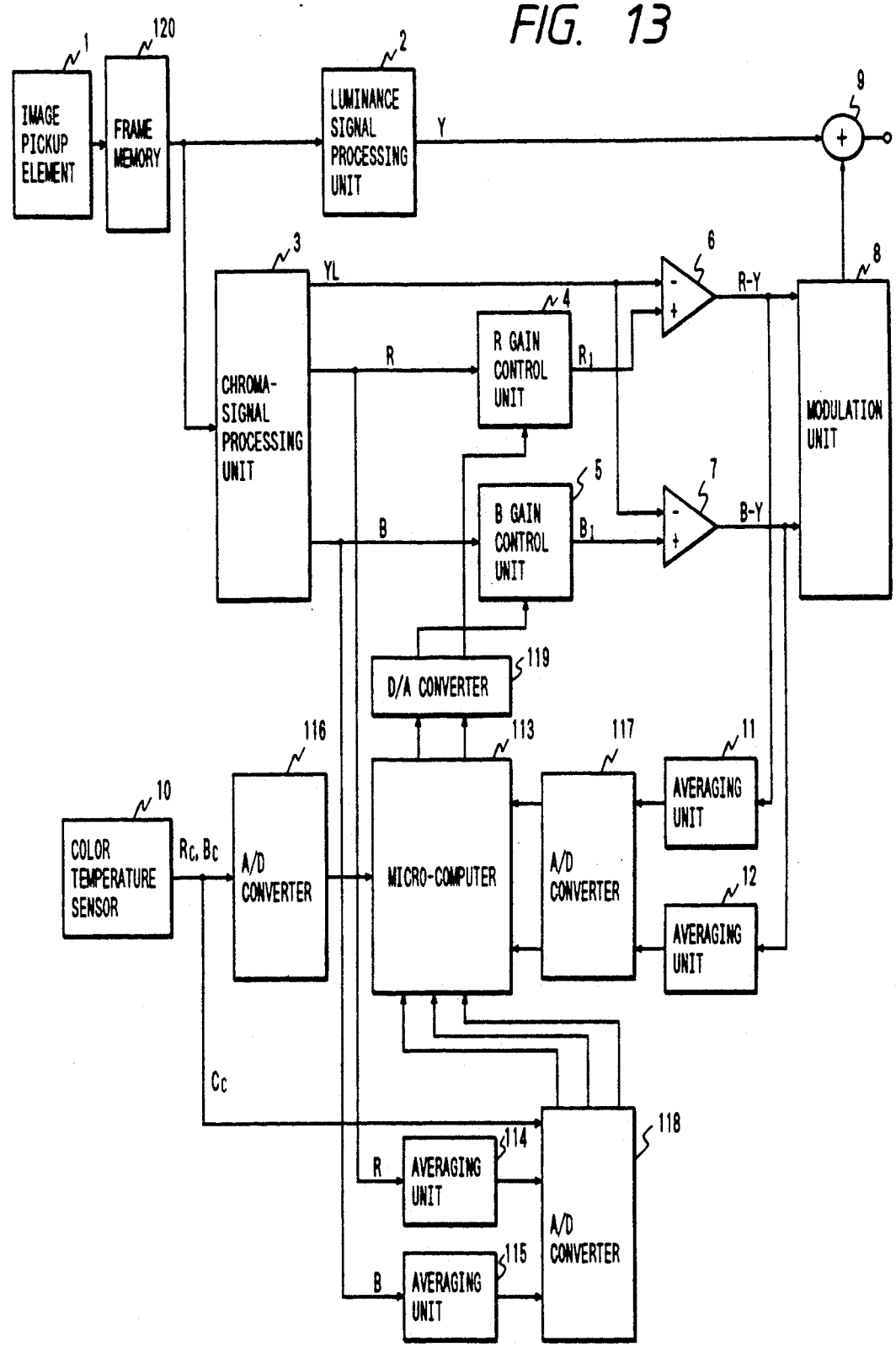
FIG. 13 is a block diagram showing the twelfth embodiment of the present invention.

FIG. 11 is a block diagram of an image pickup apparatus according to the tenth embodiment of the present invention. Blocks 1 to 12 correspond to blocks denoted by the same reference numerals as in the conventional arrangement. The image pickup apparatus of the tenth embodiment also includes a micro-computer 113, averaging units 114 and 115 for averaging the R and B signals of one frame to several frames, A/D converters 116, 117, and 118, and a D/A converter 119. FIG. 12 is a flow chart for explaining an operation of the tenth embodiment.

In this embodiment, the image pickup element 1, the averaging units 11 and 12, and the A/D converter 117 constitute a first white balance adjusting means. The color temperature sensor 10 serving as a color measure sensor except for the image pickup element, and the A/D converter 116 constitute a second white balance adjusting means. The micro-computer 113 constitutes a synthesizing means.

This micro-computer 113 switches the synthesis ratio of the control signals output from the first and second white balance adjusting means between 0% and 100%. That is, one of the control signals from the first and second white balance adjusting means is selected and output.

FIG. 12 is a flow chart showing an operation of the micro-computer 113.

An operation of the tenth embodiment will be described with reference to FIGS. 11 and 12. The operations of the blocks 1 to 12 are the same as those of the conventional arrangements of FIGS. 1 to 3.

Outputs R and B of one frame to several frames from the chrominance signal processing unit 3 are averaged by the averaging means 114 and 115. The average values are input to the A/D converter 118, and the A/D converter 118 outputs digital signals $R_D$ and $B_D$. An output $C_C$ (a ratio $R_C/B_C$ as a ratio of a red component to a blue component of light source light obtained by the color temperature sensor) from the color temperature sensor 10 serving as a color measure sensor except for the image pickup element is also A/D-converted by the A/D converter 118, and a signal $C_{CD}$ is output. In FIG. 12, $C_0 = 0$ is set as an initial condition in step S20. The micro-computer 113 receives outputs $C_{CD}$, $R_D$, and $B_D$ from the A/D converter 118 (steps S21 and S22). In step S23, $C_D = R_D/B_D$ is calculated. $C_{D'} = R_D/B_D$ is calculated in step S23. $C_{CD'} = |C_D - 1|$ is calculated in step S24. $C_{CD'} = |C_{CD} - 1| + C_0$ is calculated in step S25. In the initial state, since condition $C_0 = 0$ is established, so that $C_{CD'} = |C_{CD} - 1|$ is established. In step S26, $C'$ is compared with $C_C$. If condition $C_{D'} < C_{CD'}$ is established, outputs from the R-Y and B-Y averaging units 11 and 12 are A/D-converted by the A/D converter 117 in step S27. The digital data are input to the micro-computer 113. In step S28, a white balance control voltage is derived from the input values and is input to the D/A converter 119 in step S28. Thereafter, in step S29, $C_0 = 0.2$ is set, and the flow returns to step S21. However, if condition $C_{D'} > C_{CD'}$ is established in step S26, a control voltage is derived from the color temperature output $C_{CD}$ in step S30. This control voltage is output to the D/A converter 119. $C_0 = -0.2$ is set in step S31, and the flow returns to step S21.

In this case, the value $C_0$ is switched between 0.2 and $-0.2$ to provide hysteresis characteristics. As a result, if $C_{D'} \simeq C_{CD'}$ is given, i.e., if a value is close to the threshold, the white balance scheme is not easily changed, and readability is not greatly degraded.

As described above, of the ratios R/B and $R_C/B_C$ of the image pickup outputs R and B and the color temperature sensor outputs $R_C$ and $B_C$, if the ratio R/B is closer to 1 than the ratio $R_C/B_C$, i.e., if an influence of an object color is small, the first white balance adjusting means for setting the TTL mode not suitable for white balance control of a monotonic frame is selected. However, if the ratio $R_C/B_C$ is closer to 1 than the ratio R/B, the second white balance adjusting means for setting the outer measure mode is selected, thereby always performing white balance adjustment.

The values of 0.2 and $-0.2$ of the $C_0$ may be replaced with other values to match a degree of hysteresis with a specific image pickup purpose. The switching operation of this embodiment may be performed when the ratio $R_C/B_C$ or R/B falls outside a predetermined range of 2 or more to less than 0.5. In this case, even if a large error occurs in one of these ratios due to an influence of the object color, white balance adjustment can be performed by eliminating the large difference. As a result, a desirable image pickup result can be obtained.

In this embodiment, the control signals from the white balance adjusting means are selectively used. However, the control signals may be used to change the synthesis ratio continuously or stepwise, thereby achieving white balance control on the basis of control signals having higher precision.

As the eleventh embodiment as a modification of the tenth embodiment, an $R_C/G_C$ signal and a $B_C/G_C$ signal representing the ratios of red to green and blue to green may be obtained from the color temperature sensor 10, the R, G, and B signals may also be obtained from the chrominance signal processing unit 3, and R/G and B/G signals may be input to the micro-computer 13 and are compared with each other, thereby determining a correspondence between one of the signal outputs and white balance control signal derivation. In this case, particularly, when both the ratio of red to green and the ratio of blue to green are larger than 1, the image is not influenced by the light source but by the color of the object. When such a value is detected, that is, when the detecting element, e.g., the color temperature sensor 10 detects $R_C/G_C > 1$ and $B_C/G_C > 1$, outputs from the image pickup element 1, i.e., the R-Y and B-Y average signals are selected to derive a control voltage. More specifically, white balance adjustment is performed by a control signal from the first balance adjusting means to eliminate the influence of the object color with good precision.

In the above embodiment, predetermined processing is directly performed for an output from the image pickup element 1. However, an output from the image pickup element 1 is stored in an image memory as a frame memory 120 of the twelfth embodiment shown in FIG. 11 once, and the predetermined processing may be performed for an output from the image memory. In this case, processing in units of frames can be easily performed, and precision can be expected to be improved.

In the tenth to twelfth embodiments, the R-Y and B-Y signals are used as color signals used in the first white balance adjusting means. As the thirteenth embodiment, R, G, and B chrominance signals may be used as the color signals.

In this case, an effect of white balance adjustment is further improved.

In the first to thirteenth embodiments, a control signal is obtained as a signal used in the first white balance adjusting means by averaging the chrominance signals on the entire frame in the TTL mode. In the fourteenth embodiment, however, another method of obtaining a control signal by utilizing only chrominance signals of high-luminance components may be utilized.

In the tenth to fourteenth embodiments, the first or second white balance adjusting means is selected to obtain a control voltage of a TTL or outer measure mode. In the fifteenth embodiment, however, values in consideration of both the control voltages such as an average value or a value close to the average value of the control voltages of both the modes may be used near a switching threshold, thereby gradually changing the control voltages.

In this case, a more stable image pickup operation can be performed with a value close to the threshold value.

In the eleventh to fifteenth embodiments, when a ratio of three primary color components of each of the color temperature sensor 10 and the image pickup element 1 is as large as one, white balance cannot often be optimally adjusted. As the sixteenth embodiment, a warning signal may be output or a control voltage corresponding to a scene not suitable for the above condition may be stored.

Figure 14:
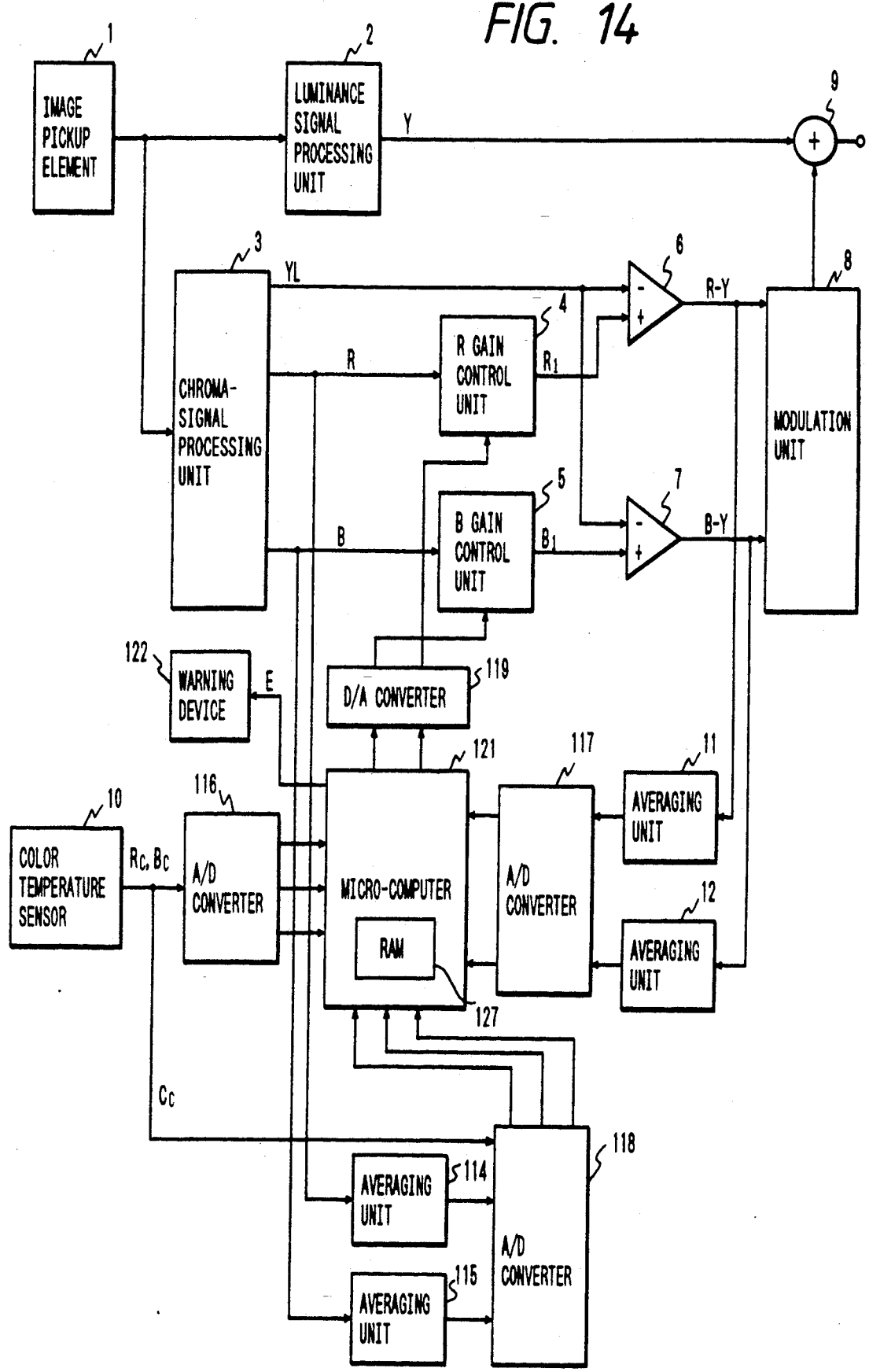
FIG. 14 is a block diagram showing the sixteenth embodiment of the present invention.
Figure 15:
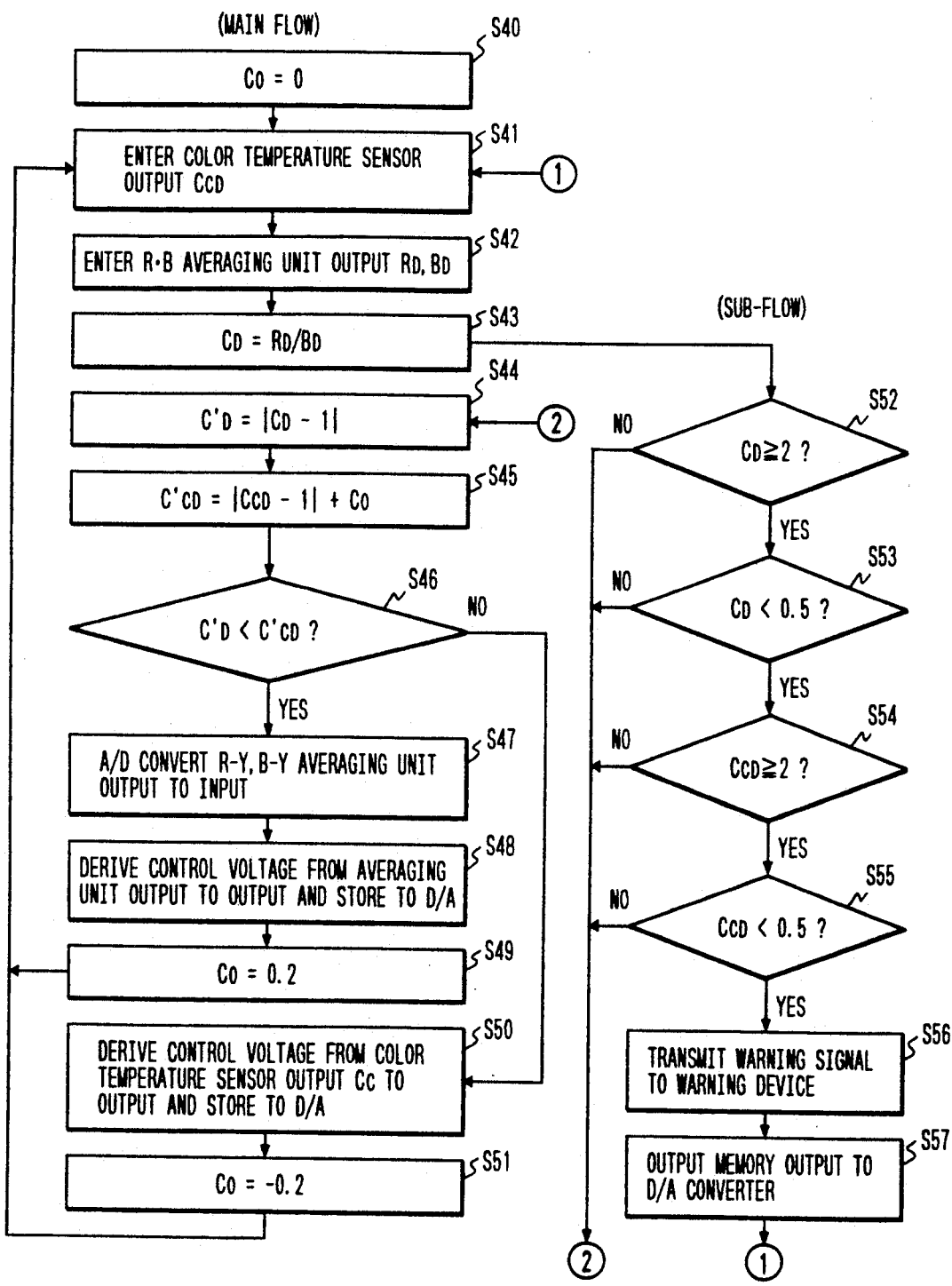
FIG. 15 is a flow chart for explaining the sixteenth embodiment.

FIGS. 14 and 15 show the sixteenth embodiment.

The same reference numerals as in the previous drawings denote the same parts in FIG. 14. A micro-computer 121 serves as a synthesizing means having a memory 127 serving as a memory means. A warning device 122 generates a photographic warning signal. Operations of blocks 1 to 118 are the same as those of the tenth embodiment in FIG. 11. An operation of the micro-computer 121 will be described with reference to a flow chart in FIG. 15. The main flow in FIG. 15 is the same as that of the tenth embodiment of FIG. 12 except for steps S48 and S50. That is, in steps S48 and S50, storage of a derived white balance control voltage in the non-volatile memory 127 in the micro-computer 121 is added to steps S28 and S30 in the tenth embodiment of FIG. 12. In the sub-flow, after $C_D=R_D/B_D$ is derived in step S43, conditions $C_D \geq 2$, $C_D < 0.5$, $C_{CD} \geq 2$, and $C_{CD} < 0.5$ are confirmed in steps S52 to S55. If one of the conditions is determined to be NO, the flow advances to the main flow in step S44, and white balance adjustment is performed as in the tenth embodiment. If all the conditions are determined to be YES, the flow advances to step S56. In step S56, the micro-computer 121 sends a warning signal E to the warning device 122, and warning is performed. In step S57, the white balance control voltage data stored in steps S48 and S50 is output to the D/A converter 119 to perform white balance adjustment.

When a difference between each of the outputs from the image pickup element 1 and the color temperature sensor 10 and a value of "one" is large (e.g. 2 or more, or less than 0.5), a warning signal is output. When the difference is 0.5 or more but less than 2, a white balance control voltage is used to perform white balance adjustment. Other values except for 2 or 0.5 may be used.

White balance adjustment can be performed on the basis of storage of the image pickup apparatus under a special condition. In addition, this special condition can be known by the warning device.

As described above, according to the tenth to sixteenth embodiments, the synthesis ratio of the control signal from the first white balance adjusting means on the basis of the signal output from the image pickup element and the control signal from the second white balance adjusting means on the basis of the signal output from the color measure sensor except for the image pickup element is variably output in accordance with comparison between the color measure information ratio from the image pickup element and the color measure information ratio from the color measure sensor. White balance adjustment and an image pickup operation are performed. There is provided an image pickup apparatus wherein appropriate white balance adjustment can be performed in photographic conditions, i.e., both a photographic condition not suitable for the outer measure mode (e.g., a distant view, variations in illumination conditions, back light, and a dark background) and a photographic condition not suitable for the TTL mode (i.e., an image pickup frame is formed by a monotone, e.g., the difference between the ratio R/B and one is large), and at the same time, an appropriate effect, as opposed to cancellation of advantages of both the conventional schemes as in the conventional addition scheme, can be obtained.

When a warning device for generating a photographic warning signal is provided, a ratio of three primary color components of each of the image pickup element and the color measure element arranged independently of the image pickup element has a large difference from one, and when good white balance adjustment cannot be properly performed, a warning signal is generated to signal an abnormal state to a user.

In addition, when a memory means for storing the white balance control voltages of the first and second white balance adjusting means is provided and white balance adjustment is performed in accordance with the stored white balance control voltages, and when white balance adjustment is not properly performed, white balance adjustment can be performed by using the white balance control voltages stored in the memory means.

As described above, there is provided an image pickup apparatus capable of performing optimal white balance adjustment under various conditions.

Figure 16:
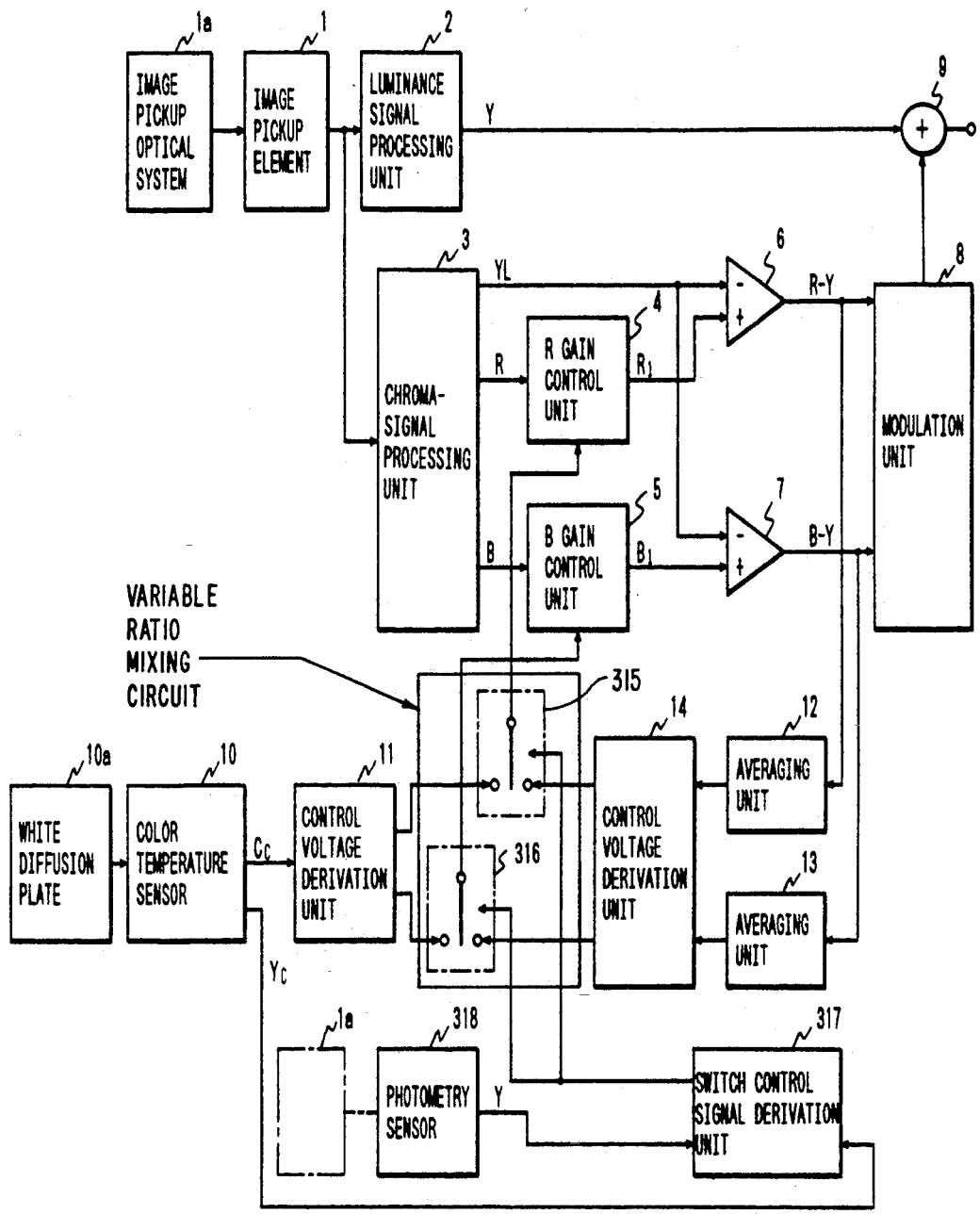
FIG. 16 is a block diagram showing the seventeenth embodiment of the present invention.

FIG. 16 is a block diagram of an image pickup apparatus according to the seventeenth embodiment according to the present invention.

Blocks 1 to 14 correspond to those denoted by the same reference numerals in the conventional arrangements.

Image pickup light is incident on the image pickup element 1 through the image pickup optical system 1a. An image pickup angle is appropriately set by the image pickup optical system 1a. A switch control signal derivation unit 317 derives a signal for switching switches 315 and 316. A photometry sensor 318 measures brightness of an object. A color temperature sensor 10 serving as a color measure sensor is arranged independently of the image pickup optical system 1a.

An optical means such as a white dispersion plate 10a is arranged in front of the color temperature sensor 10, so that an image angle of the sensor 10 is larger than an image pickup angle of the image pickup optical system 1a. Since image pickup light incident on the photometry sensor 318 through the image pickup optical system 1a is extracted through, e.g., a half mirror, the image angle of the sensor 318 is set to be a photometric image angle almost equal to the image pickup angle of the image pickup optical system 1a. Luminance information within the image pickup range of the object can be accurately output. The photometric image angle of the sensor 318 may be set to be smaller than the image pickup image angle.

Figure 17:
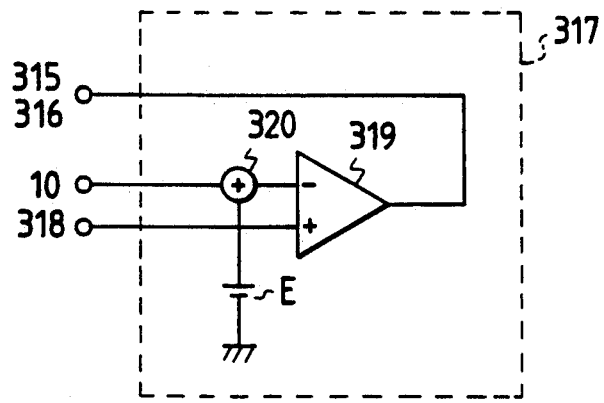
FIGS. 17 and 18 are views for explaining a switch control signal derivation unit in FIG. 16.

FIG. 17 is a block diagram for explaining the switch control signal derivation unit 318 including a comparator 319 and an adder 320.

The image pickup element 1, the averaging units 12 and 13, and the control voltage derivation unit 14 constitute a first white balance adjusting means, and the color temperature sensor 10 serving as a color measure sensor arranged independently of the image pickup element, and the control voltage derivation unit 11 constitute a second white balance adjusting means. The switch control signal derivation unit 317 and the switches 315 and 316 constitute a synthesizing means.

The synthesis ratio of the control signals from the adjusting means in the synthesizing means varies between 0% and 100%.

An operation of this embodiment will be described below.

Referring to FIG. 16, the operations of the blocks 1 to 16 are the same as those in the conventional arrangements. The switch control signal derivation unit 317 receives an output Y from the photometry sensor 318 and a signal $Y_C$ representing luminance information of the outputs form the color temperature sensor 10. The signal $Y_C$ is an output corresponding to the green component of the light source beam or a signal obtained by mixing the red, blue, and green components at an appropriate ratio.

As described above, the image angles of the color temperature sensor 10 and the photometry sensor 318 are different from each other. When an output from the color temperature sensor 10 has a large difference from the output from the photometry sensor 318, light incident on the object and light incident on the image pickup apparatus are regarded to be emitted from different light sources. In this case, the output from the switch signal derivation unit 317 is set as follows. The switches 315 and 316 are connected to the first white balance adjusting means serving as a TTL mode side, and white balance control is performed on the basis of the image pickup light from the object. However, when the difference between the outputs from the color temperature sensor 10 and the photometry sensor 318 falls within a predetermined range, the switches 315 and 316 are switched to select the second white balance adjusting means serving as an outer measure mode side.

An operation of the switch control signal derivation unit 317 will be described with reference to FIG. 17. The photometry sensor output Y is input to the noninverting input terminal of the comparator 319, and a value $Y_C+E$ obtained by adding the specific value E to the color temperature sensor output $Y_C$ is supplied to the inverting input terminal of the comparator 319. If the following condition is established:

$$Y > Y_C + E$$

the output from the switch control derivation unit 317 is set at high level. However, when the following condition is established:

$$Y < Y_C + E$$

the output is set at low level.

When the output from the switch control signal derivation unit 317 is set at high level, the switches 315 and 316 select the TTL mode side as the first white balance adjusting means, i.e., the output from the control voltage derivation unit 14 as a control voltage. However, when the output from the switch control signal derivation unit 317 is set at low level, the outer measure mode side as the second white balance adjusting means, i.e., the output from the control voltage derivation unit 11 is selected to perform white balance adjustment.

Figure 18:
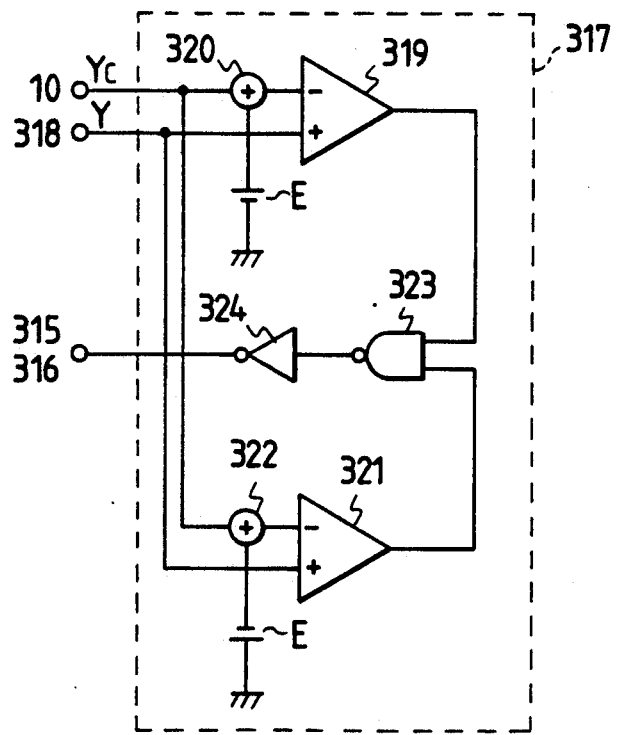

Another arrangement of the switch control signal derivation unit 317 will be described with reference to FIG. 18. The switch control signal derivation unit 317 includes a comparator 321 identical to the comparator 319 described above, an adder 322 identical to the adder 320 described above, a NAND gate 323, and an inverter 324.

In this case, if the following condition is satisfied:

$$Y_C - E < Y < Y_C + E$$

an output from the inverter 24 is set at low level, and the second white balance adjusting means is selected. However, if the following condition is established:

$$Y_C - E > Y \text{ or } Y_C + E < Y$$

the output from the inverter 24 is set at high level, and the first white balance adjusting means is selected.

In this above arrangement, if condition $Y_C - E \simeq Y$ or $Y_C + E \simeq$, the frequency of change in schemes is increased, and the comparators 319 and 321 may have hysteresis characteristics.

With the above arrangement and operation, when an object and the image pickup apparatus are adversely affected by another light source such as the presence of a distant object or back light or when object brightness is different from environmental brightness to obtain a large output from the photometry sensor, the control signal from the first white balance adjusting means is selected. When the object and the image pickup apparatus are illuminated with a single light source or when the object brightness is equal to the environmental brightness, the control signal from the second white balance adjusting means is selected to perform white balance adjustment. Therefore, appropriate white balance adjustment can be performed under different illumination conditions.

When the incident angle of the photometry sensor 318 is set to be equal to or smaller than the incident angle of the image pickup optical system 1a, there can be provided an image pickup apparatus having a more appropriate white balance adjustment effect.

When the hysteresis characteristics are provided to the switching operating point between the first and second white balance adjusting means, a stable white balance adjustment control signal can be obtained near the switching point, thereby performing a stable image pickup operation.

Figure 19:
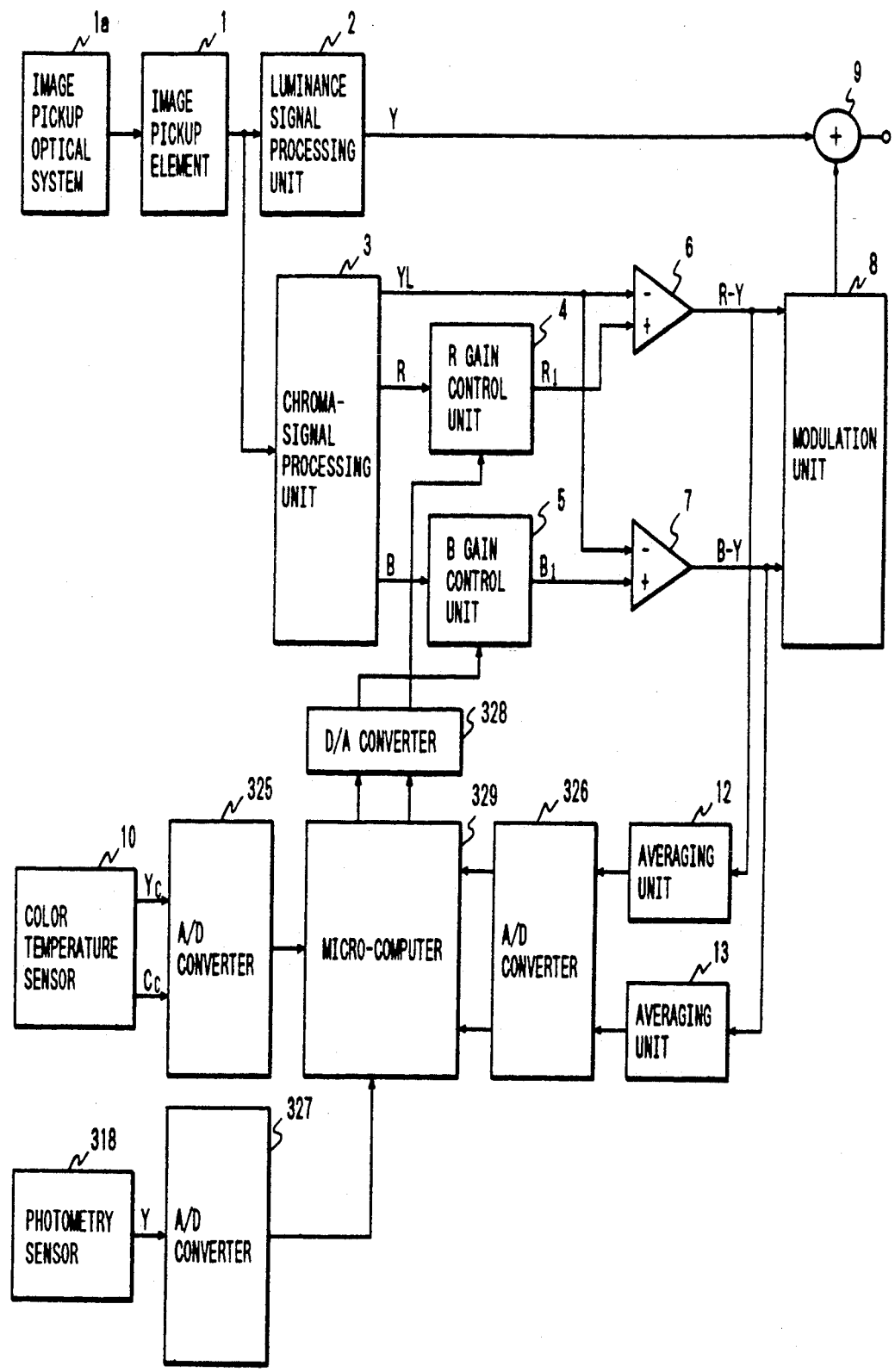
FIG. 19 is a block diagram showing the eighteenth embodiment of the present invention.

FIG. 19 is a block diagram of an image pickup apparatus according to the eighteenth embodiment of the present invention. Blocks 1a, 1 to 10, 12, 13, and 318 correspond to those denoted by the same reference numerals in the seventeenth embodiment of FIG. 16. The image pickup apparatus also includes A/D converters 325, 326, and 327, a D/A converter 328, and a micro-computer 329. The image pickup element 1, the averaging units 12 and 13, and the A/D converter 326 constitute a first white balance adjusting means, and the color temperature sensor 10 serving as a color measure sensor arranged independently of the image pickup element, and the A/D converter 325 constitute a second white balance adjusting means. The micro-computer 329 constitutes a synthesizing means.

Figure 20:
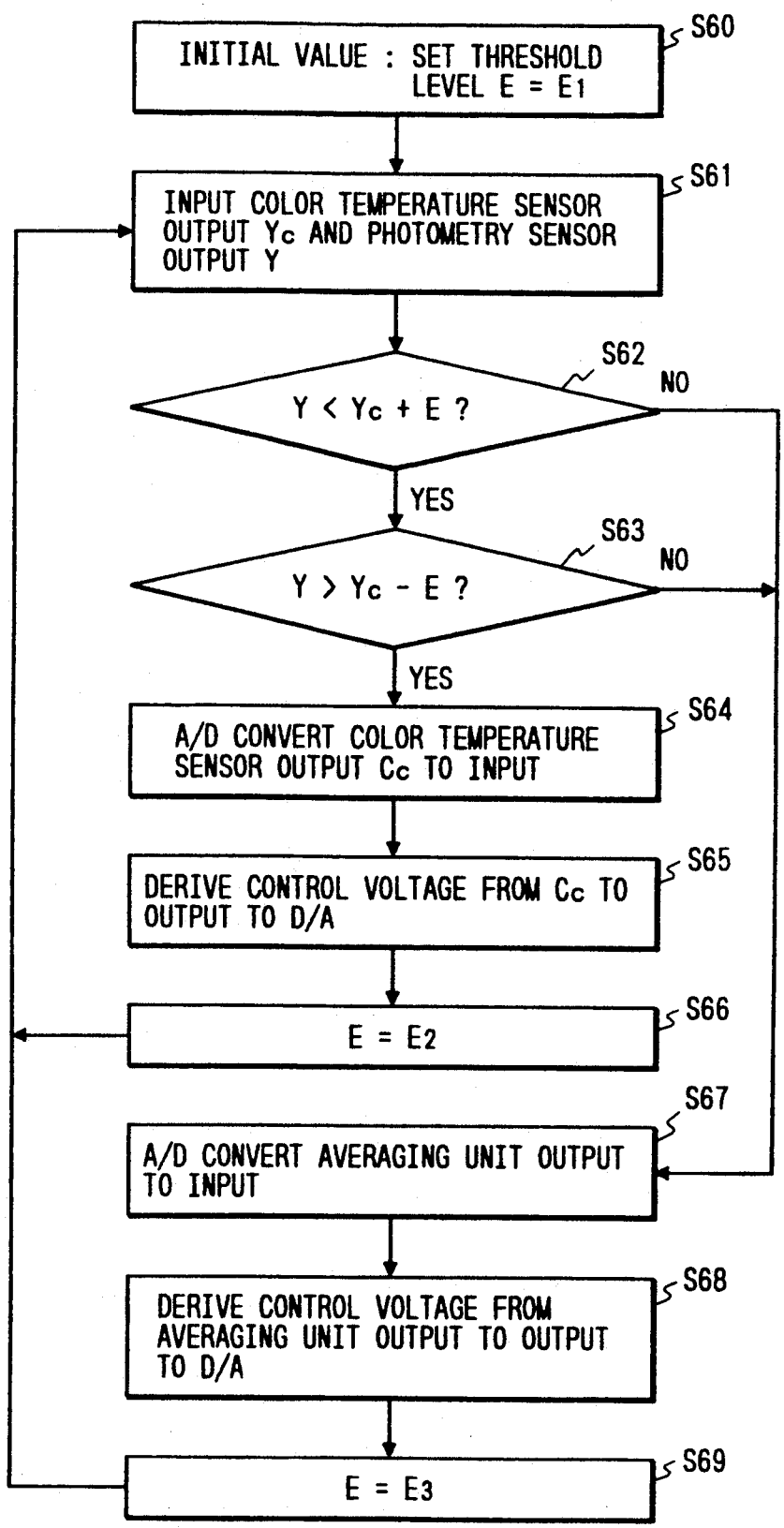
FIG. 20 is a flow chart for explaining the eighteenth embodiment.

FIG. 20 is a flow chart for explaining an operation of the micro-computer 329 in FIG. 19. An operation of the eighteenth embodiment will be described with reference to FIGS. 19 and 20.

A threshold (threshold level) for level determination is set as $E = E_1$ (step S60). An output $Y_C$ from the color temperature sensor 10 and an output Y from the photometry sensor 318 are converted into digital data by the A/D converters 325 and 327, respectively. These digital data are then input to the micro-computer 329 (step S61). Conditions $Y < Y_C + E$ and $Y > Y_C - E$ are checked in steps S62 and 63, respectively. If YES in both steps S62 and S63, the flow advances to step S64. An output $C_C$ from the color temperature sensor 10 is converted into digital data. A white balance control signal voltage is derived from the output $C_C$ in step S65 and is output to the D/A converter 328. In step S66, condition $E = E_2$ (wherein $E_2 > E_1$) is established.

If condition $Y \geq Y_C + E$ or $Y \leq Y_C - E$ is established in step S62 or S63, the flow advances to step S67. In this step, the outputs from the averaging units 12 and 13 are A/D-converted, and digital data are input to the micro-computer 329. The micro-computer 329 drives a white balance control signal voltage and outputs it to the D/A converter 328. In addition, condition $E=E_3$ (wherein $E_3<E_1$) is established. The signals input to the D/A converter 328 are converted into analog signals. These analog signals are sent to the R and B gain control units 4 and 5, thereby performing appropriate white balance adjustment.

When a large difference is present between the output Y from the photometry sensor 318 and the luminance information output $Y_C$ from the color temperature sensor 10, the first white balance adjusting means is selected. However, when Y is closer to $Y_C$, the second white balance adjusting means is selected to perform white balance adjustment. At the same time, condition $E_2>E_1>E_3$ is given. Even if an absolute value $|Y-Y_C|$ varies near $E_1$, $E_2$, or $E_3$, hysteresis characteristics can be provided so that no influence is imposed on selection of the white balance scheme. Therefore, stable white balance adjustment can be performed near the switching point between the first and second white balance adjusting means.

Figure 21:
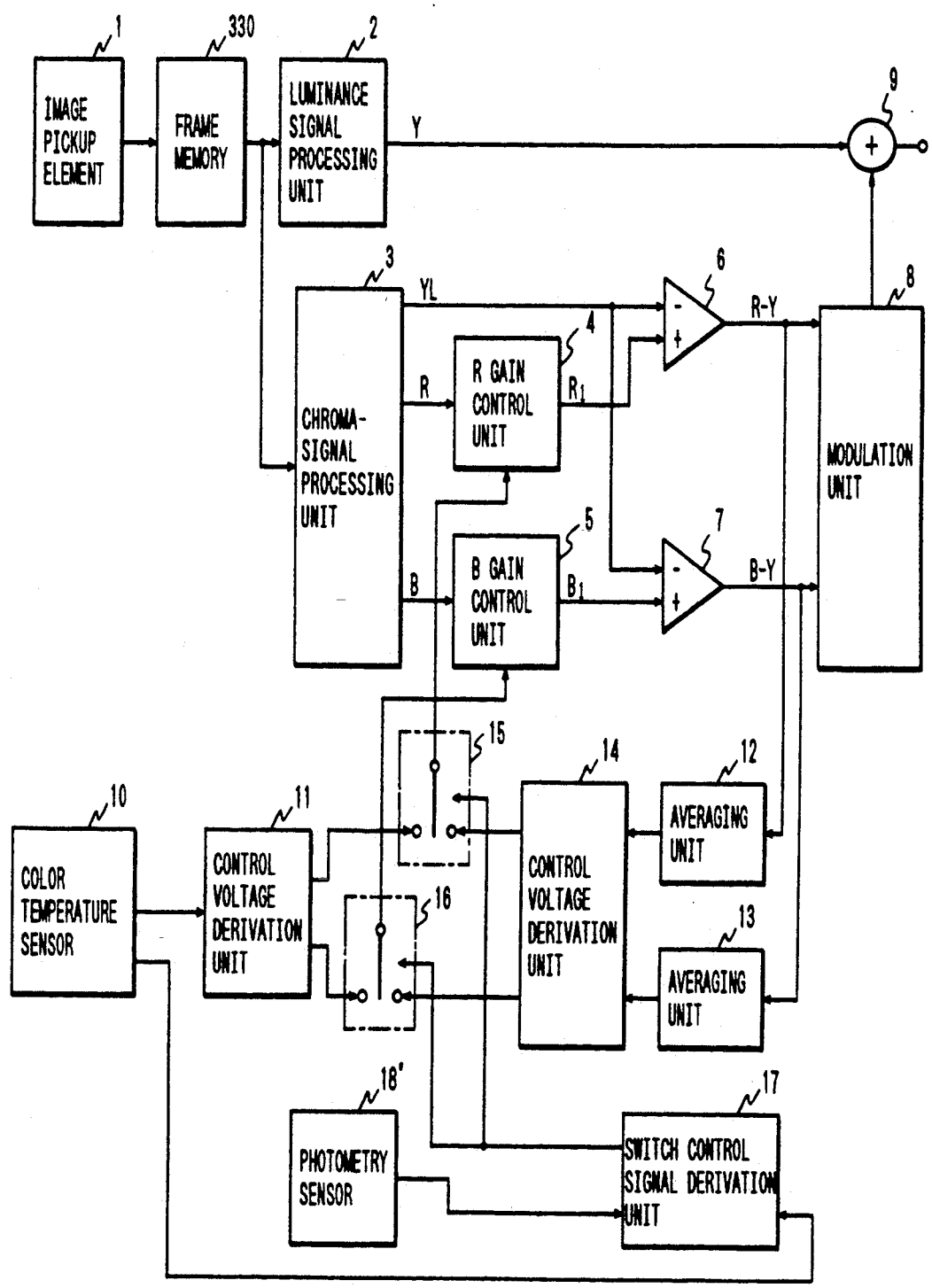
FIG. 21 is a block diagram showing the nineteenth embodiment of the present invention.

In the seventeenth and eighteenth embodiments, predetermined processing is performed directly for the output from the image pickup element 1. However, as the nineteenth embodiment, an output from the image pickup element 1 is stored in an image memory, and the predetermined processing may be performed for the readout value. FIG. 21 shows a frame memory 330 in the nineteenth embodiment. In this case, processing in units of frames can be easily performed, and an improvement of white balance adjustment precision can be expected.

In the seventeenth to nineteenth embodiments, the R-Y and B-Y signals are used as color signals used in the first balance adjusting means. However, as the twentieth embodiment, R, G, and B signals may be used as these color signals. In this case, an improvement of the white balance adjustment effect can further be expected.

In the seventeenth to twentieth embodiments, color signals of the entire frame of the TTL scheme are averaged to obtain a control signal as a signal used in the first white balance adjusting means. However, in the twenty-first embodiment, another method of obtaining a control signal by using only color signals of high-luminance portions may be used.

In the seventeenth to twenty-first embodiments, selection of the first or second white balance adjusting means is performed by selecting a control signal voltage of the TTL mode or the outer measure mode. As the twenty-second embodiment, however, values in consideration of both the control voltages such as an average value or a value close to the average value of the control voltages of both the modes may be used near a switching threshold, thereby gradually changing the control voltages.

The above value is not limited to a value close to the threshold value. Each control signal voltage may be synthesized at a predetermined ratio throughout the entire range of control signal voltages.

In the seventeenth to twenty-second embodiments, a photometry sensor independently of the image pickup optical system is used. However, as the twenty-third embodiment, an image pickup element may serve as a photometry sensor.

In each embodiment described above, the synthesis ratio by the synthesizing means of the present invention is variably changed between 0% and 100%, and each control signal is selectively output. However, the synthesis ratio may be variably changed continuously or stepwise.

In each embodiment described above, the color measure angle of the color measure sensor is larger than that of the image pickup element, but the color measure angle of the image pickup element may be larger than that of the color measure sensor.

In the above embodiment, the photometry sensor 318 is arranged independently of the image pickup element 1. However, as an output from the photometry sensor 318, a luminance signal output from the image pickup element 1 may be used, as a matter of course.

As described above, in each of the seventeenth to twenty-third embodiments, the synthesis ratio of the control signal for white balance adjustment generated by the first white balance adjusting means using the signal output from the image pickup element and the control signal for white balance adjustment generated by the second white balance adjusting means using the signal output from the color measure sensor in accordance with the difference between the signal from the image pickup element or a signal equivalent thereto and the signal output from the color measure sensor, thereby obtaining a single control signal for white balance adjustment. Appropriate white balance adjustment is performed by using this control signal, and an image pickup operation is performed. There is, therefore, provided an image pickup apparatus wherein appropriate white balance adjustment can be performed in photographic conditions, i.e., both a photographic condition not suitable for the outer measure mode (e.g., a distant view, variations in illumination conditions, back light, and a dark background) and a photographic condition not suitable for the TTL mode (e.g., a monotonic frame or a large influence of an monotonic object color), and at the same time, an appropriate effect, as opposed to cancellation of advantages of both the conventional schemes as in the conventional addition scheme, can be obtained.

According to the present invention, desired detection can be accurately performed regardless of colors of objects, object brightness, and object distances. Therefore, accurate white balance control can be realized.

When the incident angle of the photometry sensor is set to be equal to or smaller than that of the image pickup optical system, there is provided an image pickup apparatus having a more appropriate white balance adjusting effect.

Figure 22:
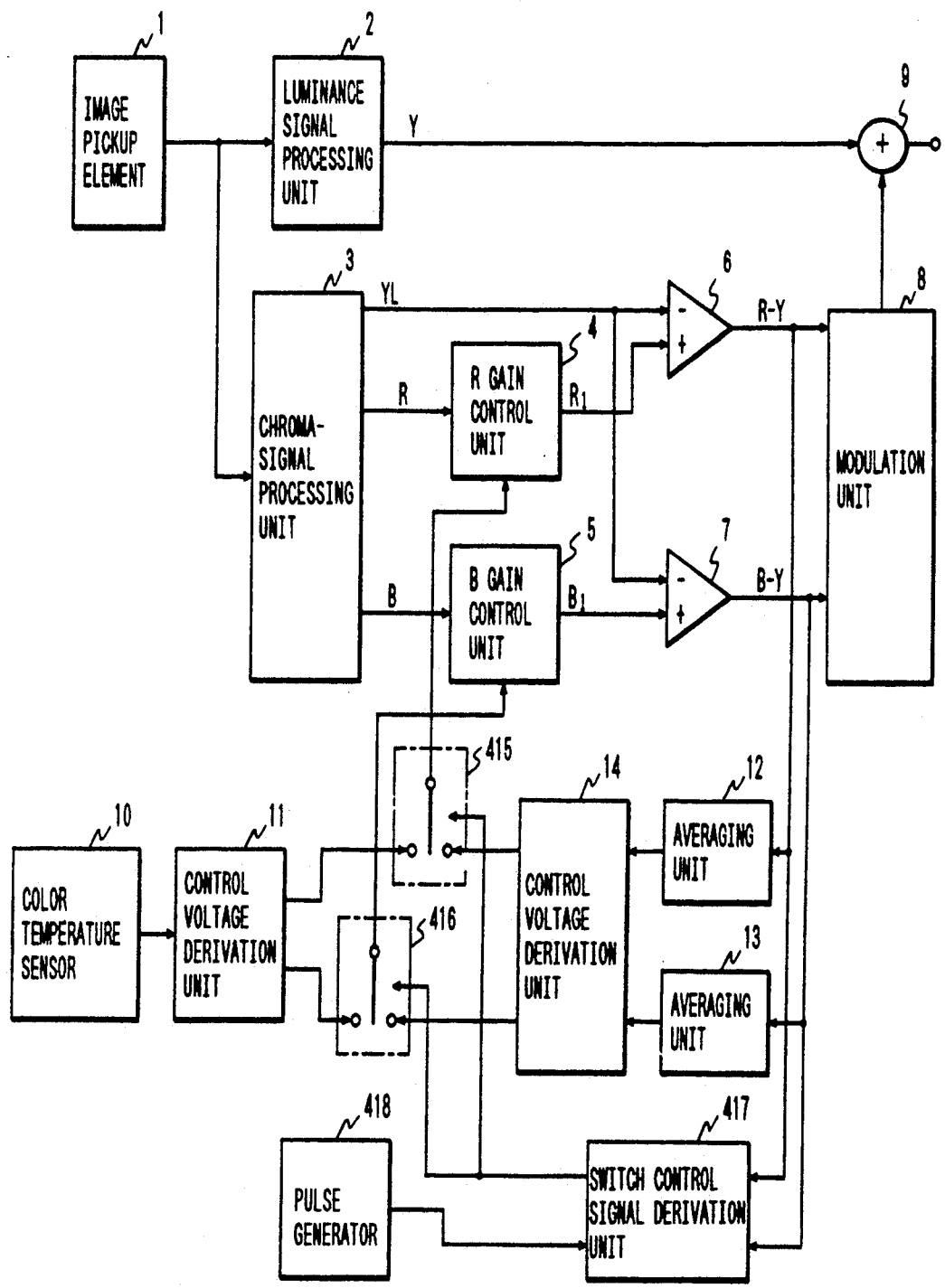
FIG. 22 is a block diagram showing the twenty-fourth embodiment of the present invention.

FIG. 22 is a block diagram of an image pickup apparatus according to the twenty-fourth embodiment of the present invention. In this embodiment, a control signal of the present invention is used to switch between the first and second white balance adjusting means. Referring to FIG. 22, blocks 1 to 14 correspond to those denoted by the same reference numerals in the conventional arrangements. The image pickup apparatus of this embodiment includes switches 415 and 416 for selecting a white balance control voltage from the control voltage derivation unit 11 or 14 and supplying the selected voltage to the R and B gain control units 4 and 5. A switch control signal derivation unit 417 compares (R-Y) signals of predetermined positions within a frame and compares (B-Y) signals of predetermined positions within the frame by using the outputs (R-Y) and (B-Y) signals from the different amplifiers 6 and 7 and a predetermined pulse to generate and derive a control signal for switching the switches 415 and 416. A pulse generator 418 generates a predetermined pulse, i.e., a sampling pulse sent to the switch control signal derivation unit 417. The image pickup element 1, the averaging units 12 and 13, the control voltage derivation unit 14 constitute a first white balance adjusting means, and the color temperature sensor 10 serving as a color measure sensor arranged independently of the image pickup element, and the control voltage derivation unit 11 constitute a second white balance adjusting means. The switch control signal derivation unit 417, the switches 415 and 416, and the pulse generator 418 constitute a synthesizing means serving as a control means.

In this embodiment, the synthesizing means selectively outputs a white balance control signal output from each white balance adjusting means. More specifically, the synthesizing means switches the synthesis ratio between 0% and 100%.

Figure 23:
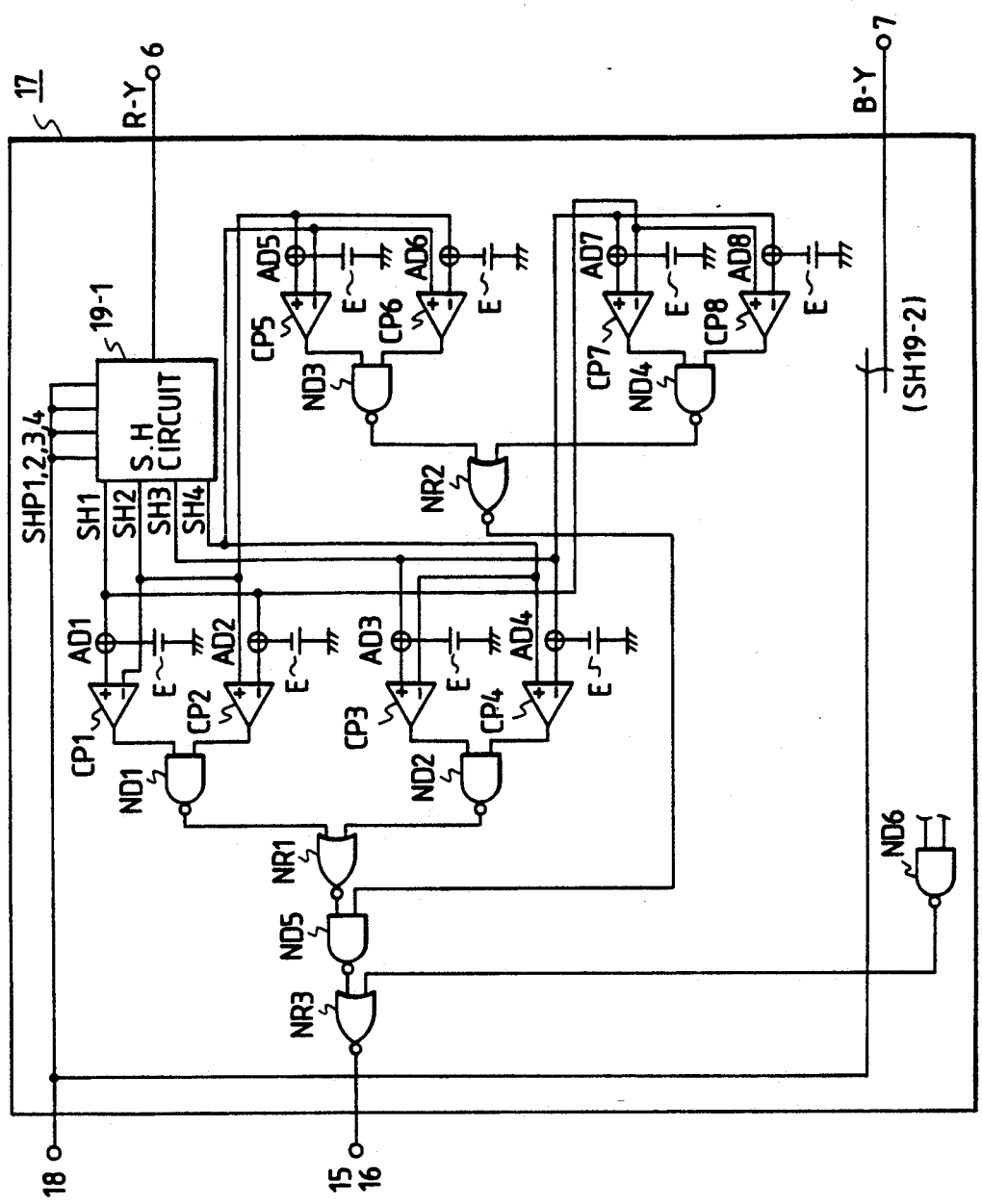
FIG. 23 is a block diagram showing a switch control signal derivation unit.

FIG. 23 is a block diagram showing part of an arrangement of the switch control signal derivation unit 417 of FIG. 22. The switch control signal derivation unit 417 includes adders AD1 to AD8, comparators CP1 to CP8, NAND gates ND1 to ND6, NOR gates NR1 to NR3, a standard voltage source E, and a sample/hold circuit (to be referred to as an S·H circuit hereinafter) 19-1. An arrangement from an operation for inputting the B-Y signal from the differential amplifier 7 to another S·H circuit 19-2 to an operation for outputting a signal to the NAND gate ND6 is identical to that from an operation for processing the R-Y signal to an operation for inputting a signal to the NAND gate ND5, and a detailed description thereof will be omitted.

Figure 25A:
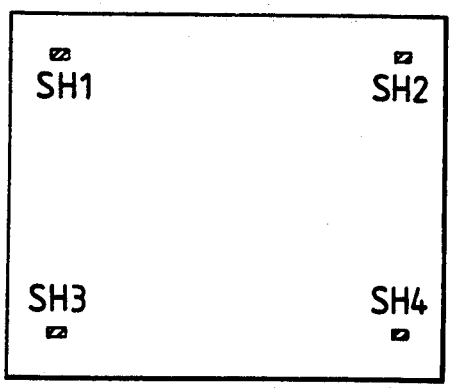
FIGS. 25A to 25C are views showing sampling points on a frame.
Figure 25B:
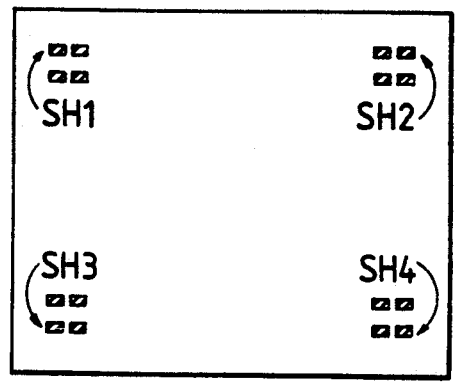
Figure 25C:
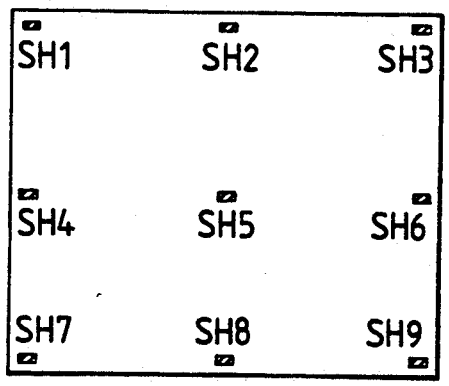

FIGS. 24 is a timing chart for explaining this embodiment, and FIGS. 25A to 25C are views showing sampling points within the frame.

An operation of the twenty-fourth embodiment will be described with reference to FIGS. 22 to 25C.

Referring to FIG. 22, operations of the blocks 1 to 14 correspond to those denoted by the same reference numerals as in the conventional arrangement. One of the white balance control voltages derived from the control voltage derivation units 11 and 14 is selected by the switches 415 and 416, and the selected control signal is sent to the R and B gain control units 4 and 5. A switching control signal for the switches 415 and 416 is generated by the switch control signal derivation unit 417 from the outputs R-Y and B-Y signals from the differential amplifiers 6 and 7 and a pulse from the pulse generator 418.

An operation of the switch control signal derivation unit 417 will be described in detail with reference to FIGS. 23 and 24.

The output signal R-Y (a in FIG. 24) from the differential amplifier 6 is input to the S·H circuit 19-1. The S·H circuit 19-1 samples the R-Y signal during the high-level period of sample hold pulses SHP1 to SHP4 (c to h in FIG. 3) sent from the pulse generator 418. During a period except for the above period, the held pulses SH1 to SH4 (i to l in FIG. 24).

SHP1 and SHP2 in this embodiment sample left and right R-Y signals on the upper scanning line of the predetermined frame, as shown in FIG. 25A. SHP3 and SHP4 in FIG. 25A sample left and right R-Y signals on the lower scanning line of the frame. These SHP1 to SHP4 sample the corner R-Y signals on the frame.

The SHP1 and SHP2 and the SHP3 and SHP4 are located on the leading and trailing positions on one scanning line, as indicated by g and h in FIG. 24. The SHP1 and SHP2 may be located on a scanning line different from that of the SHP3 and SHP4.

Pairs of the derived signals SH1 to SH4 are extracted and compared with each other. For example, the signals SH1 and SH2 are paired and extracted, and the signal SH1 is supplied to the adders AD1 and AD2. The adders AD1 and AD2 are also applied with a positive voltage E and a negative voltage $-E$, respectively. Outputs from the adders AD1 and AD2 are connected to the positive terminal of the comparator CP1 and the negative terminal of the comparator CP2. The signal SH2 is connected to the negative terminal of the comparator CP1 and the positive terminal of the comparator CP2. If the following condition is established:

$$SH1+E>SH2$$

then the comparator CP1 is set at high level. If the following condition is established:

$$SH1-E<SH2$$

then the comparator CP2 is set at high level. Outputs from the comparators CP1 and CP2 are input to the NAND gate ND1. Therefore, when the following condition is established:

$$SH1-E<SH2<SH1+E$$

the NAND gate ND1 is set at low level. That is, the output from the NAND gate ND1 is set at low level only when a level difference between the signals SH1 and SH2 is smaller than a value corresponding to the predetermined level E.

Similarly, outputs from the NAND gates ND2, ND3, and ND4 are set at low level only when differences between the signals SH3 and SH4, between the signals SH2 and SH4, and between the signals SH1 and SH3 are smaller than values each corresponding to the predetermined level E.

An output from the NOR gate NR1 is set at high level when both the outputs from the NAND gates ND1 and ND2 are set at low level. When both the outputs from the NOR gates NR1 and NR2 are set at high level, the output from the NAND gate ND5 is set at low level.

That is, an output from the NAND gate ND5 is set at low level only when the signals SH1 to SH4 satisfy the following conditions:

$$SH1-E<SH2<SH1+E$$

$$SH4-E<SH3<SH4+E$$

$$SH2-E<SH4<SH2+E \text{ and}$$

$$SH3-E<SH1<SH3+E$$

The sample hold pulses SHP1 to SHP4 shown in FIG. 24 respectively correspond to the upper left, upper right, lower left, and lower right positions on the frame in FIGS. 25A to 25C in the order named. In this embodiment, the magnitudes of the R-Y signals at four corners are compared with each other. When differences of the symmetrical signals, i.e., the right and left signals and the upper and lower signals are smaller than E, and a difference between the sum of a pair of diagonal signals and the sum of the other pair of diagonal signals is smaller than 2E, an output from the NAND gate ND5 is set at low level.

Similar processing is performed for the output B-Y from the differential amplifier 7. Only when differences between the right and left signals components and the upper and lower signal components are smaller than E and the difference between the sum of one pair of diagonal signals and the sum of the other pair of diagonal signals is smaller than 2E, the output from the NAND gate ND6 is set at low level.

Only when both the outputs from the NAND gates ND5 and ND6 are set at low level, i.e., only when both the R-Y and B-Y signals satisfy the above conditions, an output from the NOR gate NR3 is set at high level.

With the above arrangement and operation, when the output from the NOR gate NR3, i.e., the output from the switch control signal derivation unit 417 is set at high level, a difference of the color or chrominance signals at the sampling points is smaller than the predetermined value E. Most of the entire screen is estimated to be formed by a monotone. This corresponds to a scene not suitable for the TTL mode. The switches 415 and 416 are connected to the outer measure mode side serving as the second white balance adjusting means. That is, when the output from the switch control signal derivation unit 417 is set at low level, the TTL mode side serving as the first white balance adjusting means is operated to perform white balance adjustment with higher precision.

In this embodiment, threshold values (threshold levels) for detecting differences between portions having symmetrical relationships such as a horizontal relationship and a vertical relationship are set to be slightly large. Detection errors can be eliminated even in the diagonal direction which tends to cause a color level difference due to a light intensity variation by a shadow even in a single object.

The first white balance adjusting means of the TTL mode or the second white balance adjusting means of the outer measure mode is selectively used by comparing color signals at predetermined sampling points on the frame, thereby always performing an image pickup operation with optimal white balance adjustment.

The sampling points in the above embodiment are defined as positions near the corners of the frame, but may be defined as a central portion on the frame.

The sampling points may be variably set in accordance with different types of objects. For example, when a person is to be photographed, the sampling points are set in the central portion. However, the sampling points are located at the corners when a scene is to be photographed.

As the twenty-fifth embodiment, the switch control signal derivation unit 417 of the twenty-fourth embodiment in FIG. 22 may be constituted by an A/D converter and a micro-computer.

Figure 26:
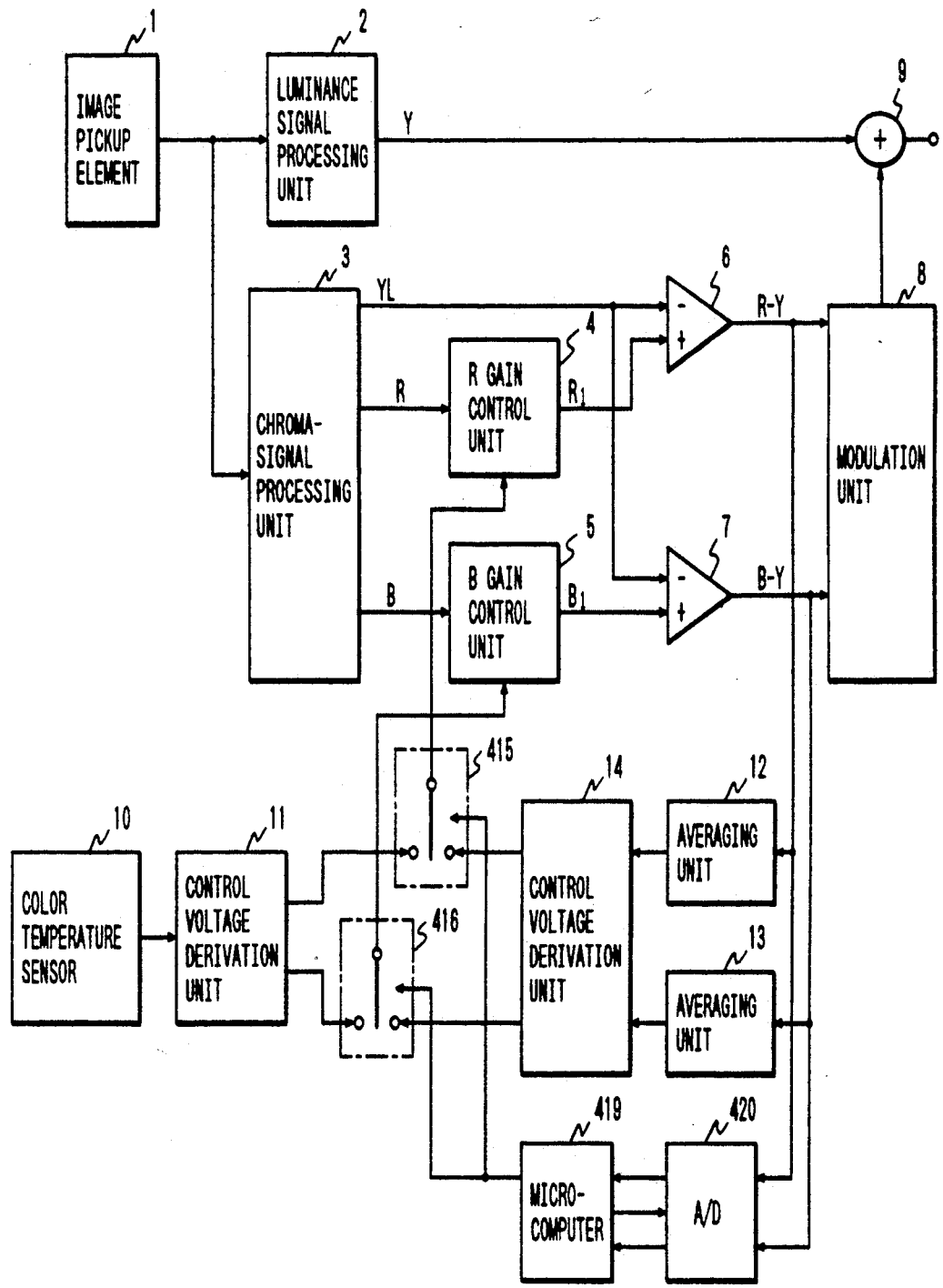
FIG. 26 is a block diagram showing an arrangement of the twenty-fifth embodiment of the present invention.

FIG. 26 is a block diagram showing the twenty-fifth embodiment. This image pickup apparatus includes a micro-computer 419 and an A/D converter 420. Other blocks of this embodiment are denoted by the same reference numerals as in the twenty-fourth embodiment.

Arrangements of first and second white balance adjusting means are the same as those in the first embodiment. The A/D converter 420, the micro-computer 419, and switches 415 and 416 constitute a selecting means.

Figure 27:
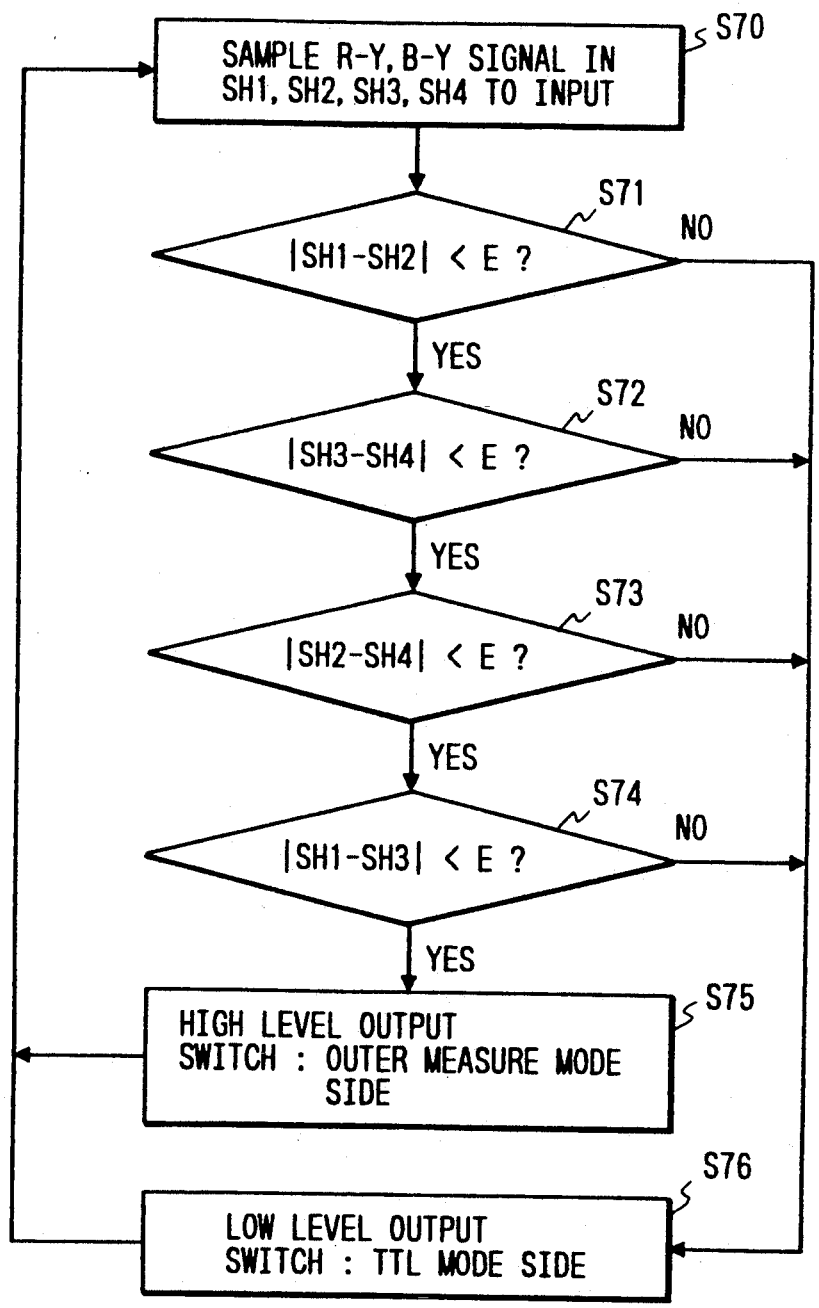
FIG. 27 is a flow chart of the twenty-fifth embodiment.

FIG. 27 is a flow chart showing an operation of this embodiment. In step S70, the A/D converter 420 samples the R-Y and B-Y signals during a predetermined period corresponding to the signals SH1 to SH4 of the first embodiment in accordance with a command from the micro-computer 419 to obtain digital signals. These digital signals are fetched by the micro-computer 419. In steps S71 to S74, the magnitudes of the signals SH1 to SH4 are compared with those of the R-Y and B-Y signals in accordance with an internal comparison instruction to check whether the signals SH1 to SH4 fall within the predetermined level range. If so, the flow advances to step S75, and a high-level signal is output to set the switches 415 and 416 to the control voltage derivation unit 11 side, thereby selecting the outer measure mode side as the second white balance adjusting means and hence performing an image pickup operation.

If the signals SH1 to SH4 do not fall within the predetermined level range, the flow advances to step S76, and a low-level signal is output to set the switches 415 and 416 to the TTL mode side as the first white balance adjusting means. Appropriate white balance adjustment is performed, and then an image pickup operation is performed.

In the twenty-fourth and twenty-fifth embodiments, the number of samples of each of the R-Y and B-Y signals and their sample period are defined by the sample hold signals SH1 to SH4. However, the number of samples and the sample points may be changed. As shown in FIGS. 25B and 25C, for example, the number of samples is increased, and the sample points are effectively set. Switching of the switches 415 and 416 is appropriately performed to accurately detect whether the frame is a monotonic frame, thereby performing accurate white balance correction. To the contrary, when the number of samples is reduced, and the circuit elements and micro-computer programs can be reduced. Appropriate design can be performed by integrating a degree of request of the precision of white balance adjustment and other request specifications.

In the twenty-fourth and twenty-fifth embodiments, the sampling values may be weighted, and the weighted sampling values may be compared with each other. That is, a threshold level (E in FIG. 23) may be set to be low for a difference between each SH value and each of the signals SH1 to SH9 with respect to the signal SH5 in FIG. 25C, and a threshold level for comparing the signals SH1 and SH9 is set to be high. In this manner, the threshold level is changed in accordance with comparison purposes to select and determine an optimal white balance adjusting means. As a result, for example, when a monotonic image is picked up, a detection error of a distance between the sampling points can be prevented to appropriately select the white balance adjusting means.

In the above embodiment, sample values of each sampling cycle by the signals SH1 to SH4 are compared with each other. In the twenty-sixth embodiment, average values of sample values of a few fields upon sampling of the SH points may be compared with each other.

Several points near the signals SH1 to SH4 on the frame may be sampled within one field period and may be averaged, and the average values may be compared with each other.

With the above arrangement, a stable appropriate white balance adjusting means free from an influence of random noise or the like can be selected.

As the twenty-seventh embodiment, the number of samples, the sample points, and their weighting in the twenty-fourth and twenty-sixth embodiments may be changed on the basis of color temperature information, auto-exposure control (AE) information, distance information from an auto-focus control (AF) sensor, and focal distance information obtained by using a zoom lens. For example, when an object is a distant object, and the focal distance is long, the light source for illuminating the external color measure sensor and the light source for illuminating the object are often different from each other. The number of samples is increased to select the first white balance adjusting means of the TTL mode, and the sample points are shifted closer to the four corners of the frame than the positions shown in FIG. 25A.

Even if the object is a distant object, the focal distance is long, and the number of samples and the sample period are changed, as shown in FIG. 25C, if the second white balance adjusting means of the outer color measure mode is selected, good white balance correction is not often performed. A photographic warning signal is output in accordance with the control signal according to the present invention, and an optimal white balance adjusting means can be selected. In particular, a severe condition can be known by the warning signal.

Figure 28:
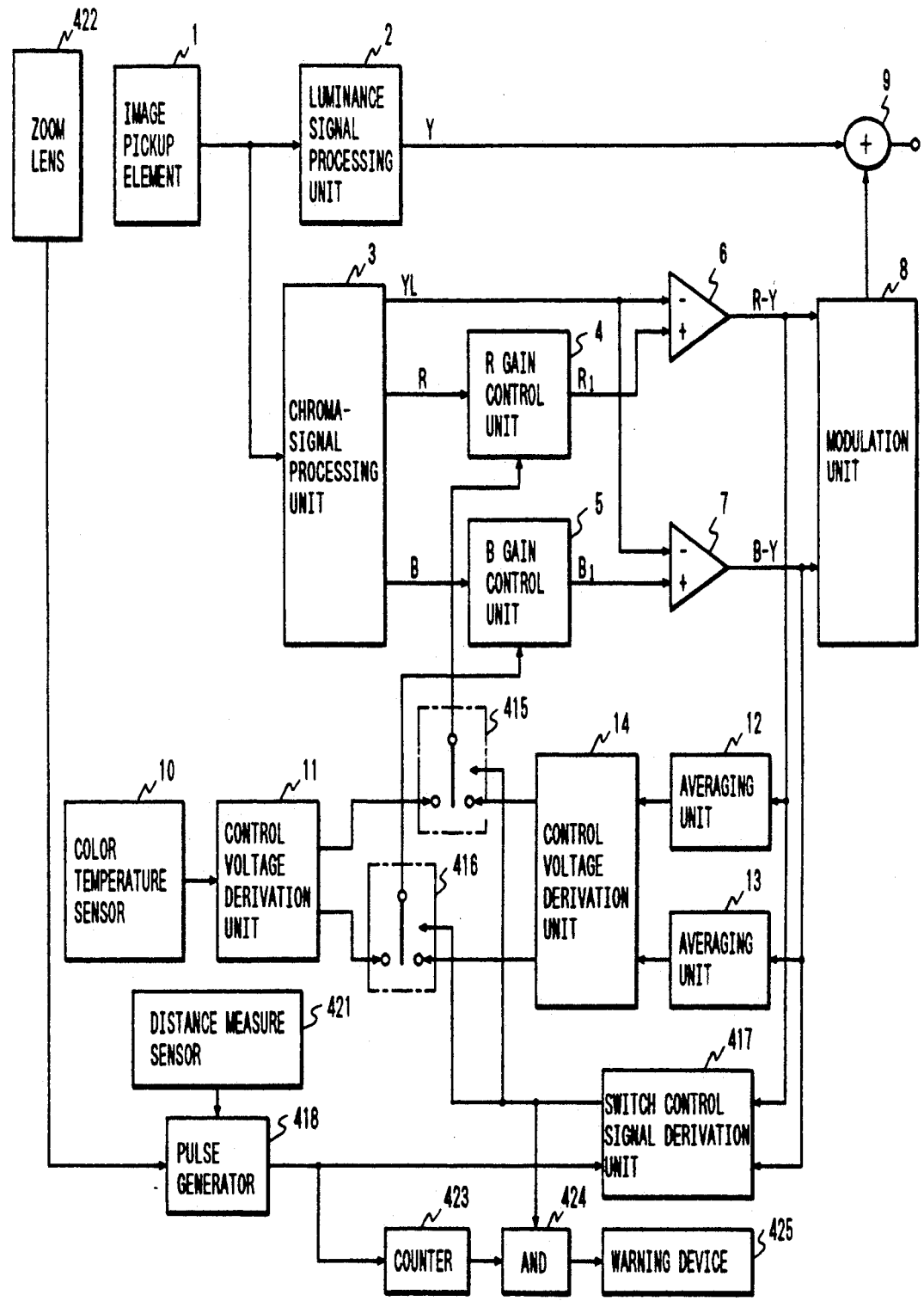
FIG. 28 is a block diagram showing the twenty-seventh embodiment of the present invention.

An arrangement for this purpose is shown in the block diagram of the twenty-seventh embodiment of FIG. 28. The same reference numerals as in the previous embodiments denote the same blocks in FIG. 28. An image pickup apparatus of this embodiment includes a distance measure sensor 421, a zoom lens 422, a counter 423, an AND gate 424, and a warning device 425.

Referring to FIG. 28, when a short distance between the distance measure sensor 421 and an object and a long focal distance from the zoom lens 422 are signaled to a pulse generator 418, a pulse sent from the pulse generator 418 to a switch control signal derivation unit 417 is changed such that the signal designates a peripheral portion of the frame so as to correspond to the sample positions in FIG. 25C and that the number of pulses is changed from four to nine. The switch control signal derivation unit 417 constitutes a comparator corresponding to a pulse count and sends a comparison result to switches 415 and 416. A total number of pulses output from the pulse generator 418 is counted by a counter 423. When the pulse count exceeds a predetermined value, the counter 423 outputs a signal of high level to an AND gate 424. In this case, when a switch control pulse from the switch control signal derivation unit 417 is set at high level, an output from the AND gate 424 is set at high level. The warning device 525 outputs a photographic warning signal in accordance with this high-level signal.

In the twenty-seventh embodiment, in addition to generation of a warning signal, white valve control voltages of a scene which do not satisfy the warning condition may be stored as the twenty-eighth embodiment.

Figure 29:
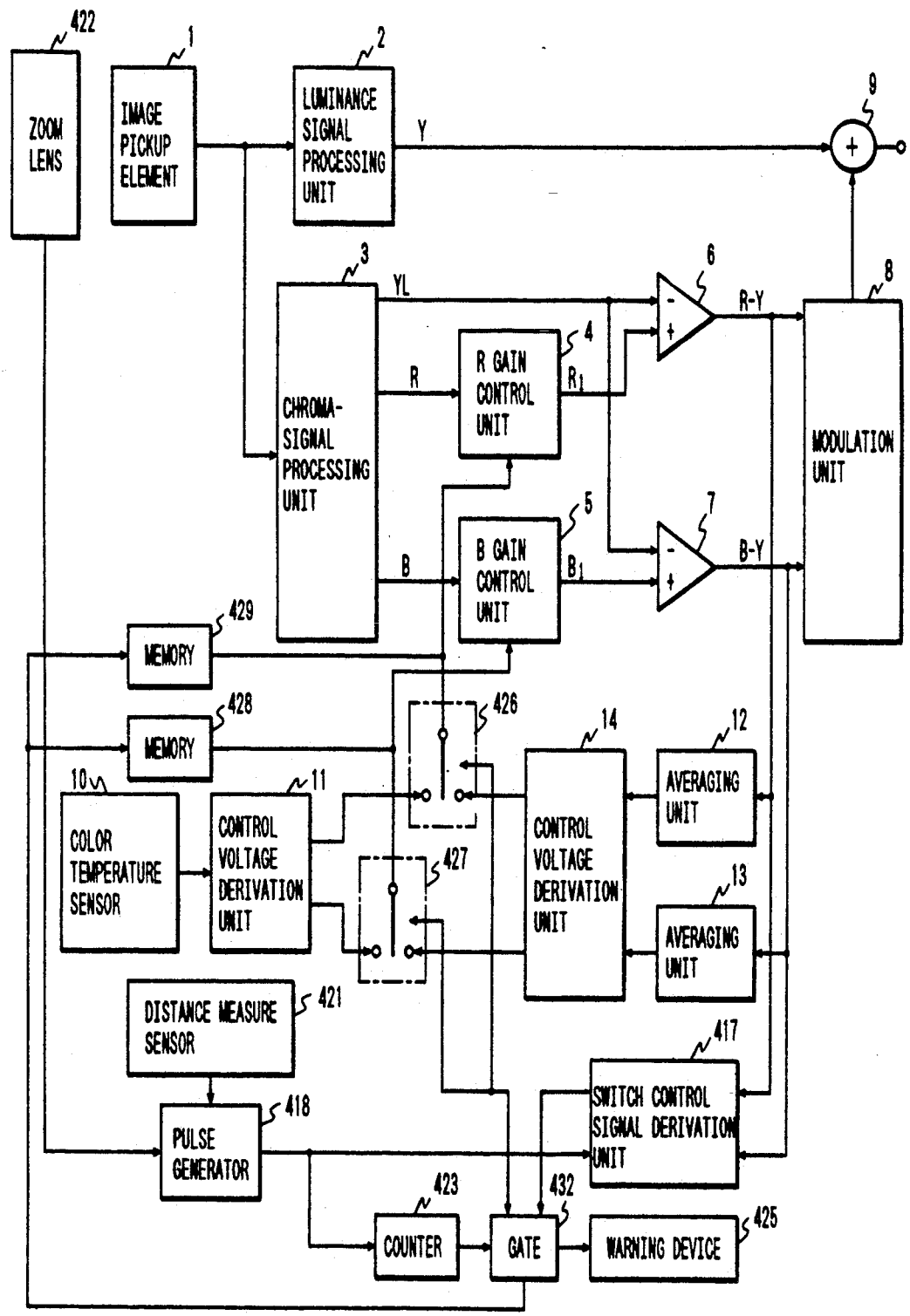
FIG. 29 is a block diagram showing the twenty-eighth embodiment.

FIG. 29 is a block diagram of the twenty-eighth embodiment. The same reference numerals as in the previous embodiments denote the same blocks in the twenty-eighth embodiment.

Figure 30:
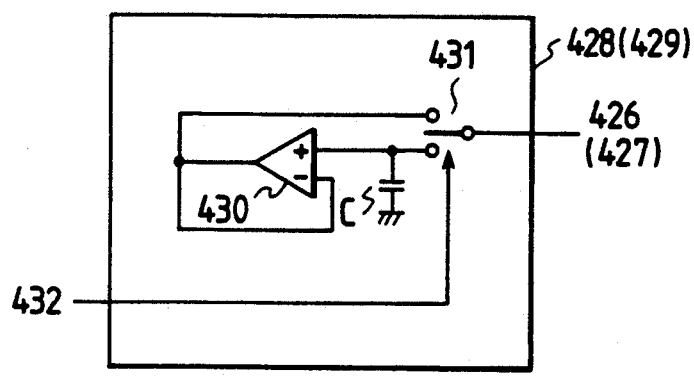
FIG. 30 is a block diagram showing a memory.

Switches 426 and 427 set a high-impedance output state. Memories 428 and 429 store white balance control voltages. FIG. 30 is a view for explaining the memories 428 and 429. A buffer 430 is arranged in each of the memories 428 and 429. The memory 428 or 429 also includes a switch 431, and a logic gate circuit 432 for generating signals for controlling the switches 426 and 427, and the memories 428 and 429.

A signal representing difficulty in white balance adjustment described in the twenty-seventh embodiment is generated by the logic gate circuit 432 and is sent to the switches 426 and 427 and the memories 428 and 429. The switches 426 and 427 are normally switched to the TTL side or the outer measure side in response to the output signal from the logic gate circuit 432. When white balance adjustment is difficult, the switches 426 and 427 are set in the high-impedance output state in response to the output from the logic gate circuit 432. Each of the memories 428 and 429 has an arrangement shown in FIG. 30. In a normal photographic mode, the switch 431 is set from the output side to the input side of the buffer 430 upon a power-ON operation. When the apparatus is powered off, the switch 431 is set to the output side of the buffer 430. In this case, when a signal representing difficulty in adjustment is sent from the logic gate circuit 432, the switch 431 is kept connected to the output side of the buffer 430 even if the apparatus is powered on. In a normal operation, the white balance control signal derived by the TTL mode or the outer measure mode is sent to R and B gain control units 4 and 5. When white balance adjustment is difficult, white balance control voltage derived by the voltages stored in the capacitors C in the memories 428 and 429, i.e., the white balance control voltage corresponding to a scene corresponding to the previous white balance adjustable state is sent to the R and B gain control units 4 and 5.

With the above arrangement and operation, even if white balance adjustment is difficult, the white balance adjustment data of the previous scene corresponding to the white balance adjustable state can be employed, and an image pickup operation can be performed.

Figure 31:
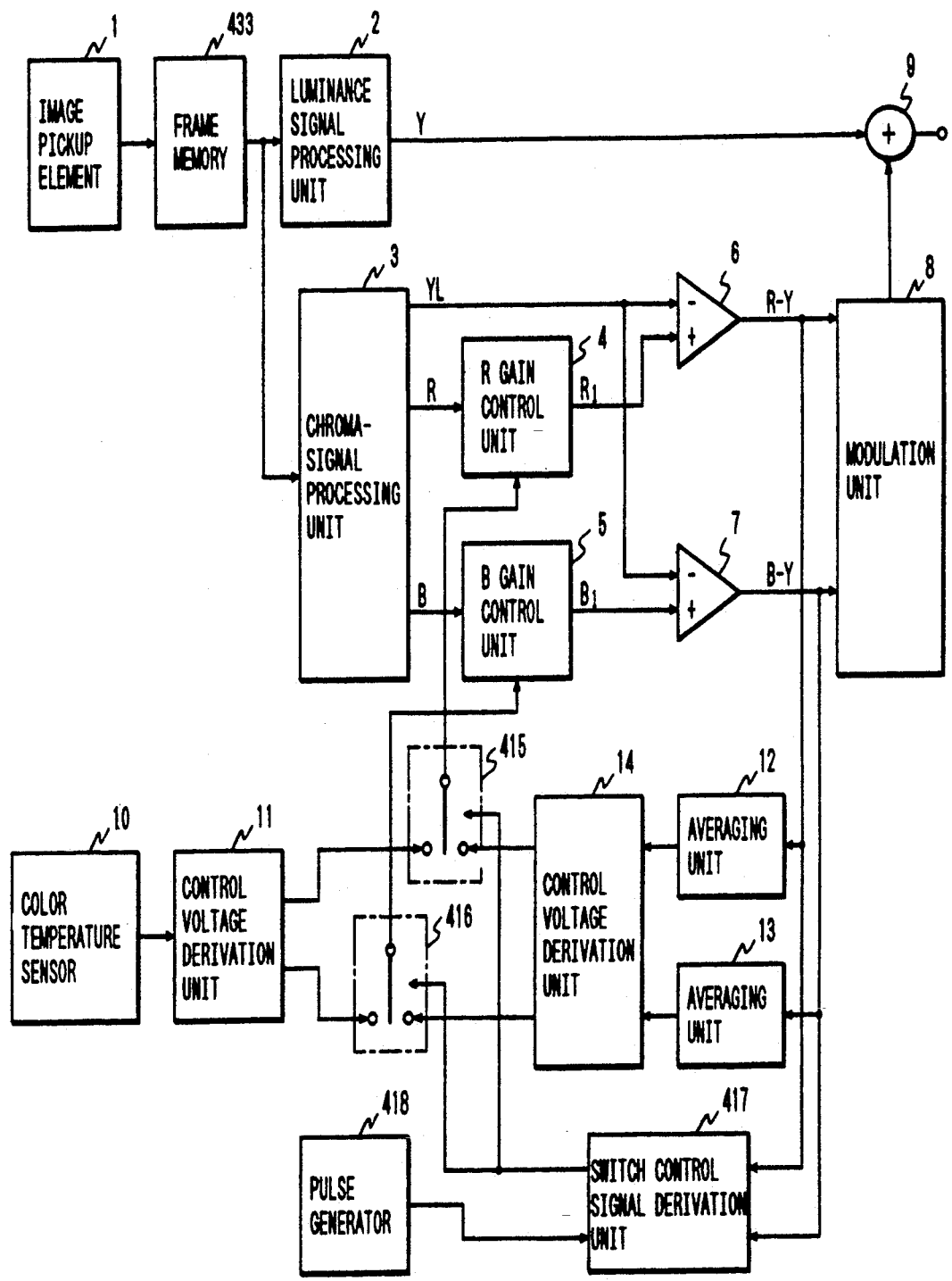
FIG. 31 is a block diagram showing the twenty-ninth embodiment of the present invention.

In the twenty-fourth to twenty-eighth embodiments, white balance adjustment processing is performed directly for the output from the image pickup element 1. However, as the twenty-ninth embodiment, an output from the image pickup element 1 may be stored in an image memory as a frame memory 433 of FIG. 31, and the white balance adjustment processing may be performed for the data read out from the frame memory 433.

In this case, processing in units of frames can be facilitated, and an improvement of white balance adjustment precision can be expected.

In the twenty-fourth to twenty-ninth embodiments, the R-Y and B-Y signals are used as color signals used in the first white balance adjusting means. However, R, G, and B signals may be used as color signals in the thirtieth embodiment.

In this case, the white balance adjustment effect can further be improved.

In the twenty-fourth to thirtieth embodiments, color signals of the entire frame are averaged to obtain a white balance control signal as a signal used in the first white balance adjusting means. However, as the thirty-first embodiment, another method of obtaining a control signal by using only color signals of high-luminance components may be used.

In the twenty-fifth embodiment, the switch control signal derivation unit 417 of the twenty-fourth embodiment of FIG. 22 is replaced with the A/D converter 420 and the micro-computer 419, as shown in FIG. 26. As the thirty-second embodiment, the control voltage derivation units 11 and 14 and the switches 415 and 416 may be constituted by an A/D converter, a micro-computer, and a D/A converter.

In this case, the constituting components can be systematized, and the micro-computer functions can be effectively utilized.

In the twenty-fourth to thirty-second embodiments, switching is performed to select one of the first and second white balance adjusting means. As the thirty-third embodiment, both the control voltages in terms of an average value of the control voltages of both the means or its approximated values near the switching threshold value (threshold level) may be mixed at a predetermined ratio to obtain a single white balance control voltage, thereby controlling the control voltage continuously or stepwise.

In this case, a stabler, preferable image pickup operation can be performed near the threshold value.

The values are not limited to values close to the threshold value. The control voltages of both the means may be mixed at a predetermined ratio throughout the entire range of the signal levels.

In the twenty-fourth to thirty-third embodiments, hysteresis characteristics may be provided to prevent an unstable operation near the threshold level in comparison operations in the comparator of the level determining means of the optical system information and the micro-computer.

In this case, a stabler, preferable image pickup operation can be performed near a threshold value.

As the thirty-fourth embodiment, time constants of the averaging units (integrators) 12 and 13 can be variably controlled by using the control signals of the present invention.

More specifically, the integrators constituting the averaging units 12 and 13 in FIG. 22 may be constituted by an arrangement using a personal computer or volume controls. These circuit components may be variably controlled in accordance with an output from the switch control signal derivation unit 417.

For example, when the object is not changed, the time constant is increased to improve precision of the control signal output from the control voltage derivation unit 14 of the TTL mode. However, when the object quickly moves, the time constant is decreased to reduce disturbance in the white balance associated with a change in object.

As described above, in the twenty-fourth to thirty-fourth embodiments, the control means compares image pickup outputs of predetermined positions on the frame upon sampling of the image pickup outputs from the image pickup element, and the white balance adjustment is performed on the basis of this comparison result. More specifically, the synthesizing means compares the signals of the predetermined positions on the frame upon sampling of the signals output from at least the image pickup element and mixes, at a predetermined ratio on the basis of the comparison result, the white balance control signal for white balance adjustment generated by the first white balance adjusting means using the signal output from the image pickup element and the white balance control signal for white balance adjustment generated by the second white balance adjusting means using the signal output from the color measure sensor arranged independently of the image pickup element. White balance adjustment is performed on the basis of the output from the synthesizing means, and an image pickup operation is performed. There is, therefore, provided an image pickup apparatus, wherein appropriate white balance adjustment can be performed in photographic conditions, i.e., both a photographic condition not suitable for the outer measure mode (e.g., a distant view, variations in illumination conditions, back light, and a dark background) and a photographic condition not suitable for the TTL mode (e.g., a monotonic frame or a large influence of an monotonic object color), and at the same time, an appropriate effect, as opposed to cancellation of advantages of both the conventional schemes as in the conventional addition scheme, can be obtained.

In the arrangement including the warning device for generating a photographic warning signal to perform white balance adjustment, a photographic warning signal is generated to signal an abnormal state to a user when white balance adjustment is not appropriately performed.

In the arrangement including the memory means for storing the white balance control voltages of the first and second white balance adjusting means so as to perform appropriate white balance adjustment by the stored white balance control voltages, the white balance control voltages stored in the memory means are used to perform optimal white balance adjustment when white balance adjustment cannot be normally properly performed.

There is provided an image pickup apparatus capable of performing appropriate white balance adjustment under various conditions.

According to the present invention, control is made not on the basis of the colors or brightness levels of objects but on the basis of a difference between sampling data. In particular, when the present invention is used for a switching operation in white balance control, an influence of the light source colors can be eliminated to accurately detect whether a frame is a monotonic frame, thereby achieving more accurate white balance control.

What is claimed is:

1. An image pickup apparatus, comprising:

first white balance adjusting means for generating a control signal for white balance adjustment by using a signal output from an image pickup element;

second white balance adjusting means for generating a control signal for white balance adjustment by using a signal output from a color measure sensor arranged independently of said image pickup element;

detecting means for detecting distance information of an optical system; and synthesizing means for synthesizing the control signals from said first and second white balance adjusting means in accordance with distance information of said optical system detected by said detecting means.

2. An apparatus according to claim 1, wherein the detected distance information is a distance between said image pickup apparatus and an object.

3. An apparatus according to claim 1, wherein the detected distance information is information of a focal distance from an image pickup optical system.

4. An apparatus according to claim 1, wherein the detected distance information is a distance between said image pickup apparatus and an object, and information of a focal distance from an image pickup optical system.

5. An image pickup apparatus, comprising:

first white balance adjusting means for generating a first control signal for white balance adjustment by using a signal output from an image pickup element;

second white balance adjusting means for generating a second control signal for white balance adjustment by using a signal output from a color measure sensor arranged independently of said image pickup element;

comparing means for comparing said signals output from said image pickup element and color measure sensor;

synthesizing means for producing a synthesized signal from said first and second control signals in a synthesizing ratio from 1:0 to 0:1 in accordance with an output of said comparing means; and control means for controlling white balance condition of the signal output from said image pickup element based on said synthesized signal.

6. An apparatus according to claim 5, further comprising a warning device for generating a warning signal based on the output of said comparing means.

7. An apparatus according to claim 5, further comprising memory means for storing said first and second control signals.

8. An image pickup apparatus for performing white balance adjustment using image pickup outputs from an image pickup element, comprising:

comparing means for comparing the image pickup outputs at a plurality of predetermined different areas on a frame upon extracting of the outputs from said image pickup element; and means for performing white balance adjustment of an image output from said image pickup element in accordance with a comparison result of said comparing means.

9. An image pickup apparatus comprising:

first white balance adjusting means for generating a white balance control signal for white balance adjustment by using a signal output from an image pickup element;

second white balance adjusting means for generating a white balance control signal for white balance adjustment by using a signal output from a color measure sensor arranged independently of said image pickup element; and synthesizing means for comparing signals of two predetermined different positions on a frame upon sampling of signals output from at least said image pickup element to generate a comparison result and synthesizing the white balance control signals from said first and second white balance adjusting means in accordance with the comparison result.

10. An apparatus according to claim 9, further comprising a warning device for generating a warning signal.

11. An apparatus according to claim 9, further comprising memory means for storing the signals from said first and second white balance adjusting means, thereby performing white balance adjustment by using the stored signals.

12. An image pickup apparatus, comprising:

(a) image pickup means for producing a video signal from an object light;

(b) extracting means for extracting the video signal at a plurality of predetermined different areas in a frame to produce a plurality of extracted information;

(c) comparison means for comparing the plurality of extracted information to output a plurality of comparison outputs; and (d) white balance adjusting means for adjusting a white balance of a full frame of the video signal by using plural of the plurality of comparison outputs.

13. An apparatus according to claim 12, wherein the video signal includes color differential signals, and said extracting means extracts the color differential signals.

14. An apparatus according to claim 12, wherein the predetermined different areas includes a center area of the frame.

15. An apparatus according to claim 12, wherein the predetermined different areas includes four corner areas of the frame.

16. An image pickup apparatus, comprising:

(a) image pickup means for producing a video signal from an object light, said video signal including a plurality of color signals;

(b) extracting means for extracting one of the plurality of color signals at a plurality of predetermined different areas in a frame to produce a plurality of extracted color information;

(c) comparison means for comparing the plurality of extracted color information to output a comparison result; and (d) white balance adjusting means for adjusting a white balance of a full frame of the video signal by using a comparison output.

17. An apparatus according to claim 16, further comprising further extracting means for extracting another one of the plurality of color signals at a plurality of predetermined different areas in a frame to produce a plurality of extracted further color information, and further comparison means for comparing the plurality of extracted further color information to output a further comparison output, wherein said white balance adjusting means adjusts the white balance of the full frame of the video signal by using both the comparison output and the further comparison output.

* * * * *

UNITED STATES PATENT AND TRADEMARK OFFICE
CERTIFICATE OF CORRECTION

PATENT NO. : 5,283,632

DATED : February 1, 1994

INVENTOR(S) : Masao Suzuki

It is certified that error appears in the above-indentified patent and that said Letters Patent is hereby corrected as shown below:

Col. 3, line 3. Delete "The"

Col. 3, line 14. Delete "are"

Col. 3, line 33. Change "an" to -- a --

Col. 4, line 35. Change "an" to -- a --

Col. 5, line 31. Change "an" to -- a --

Col. 6, line 47. Change "predetermine" to -- predetermined --

Col. 8, line 18. Change "comprises" to -- comprise --

Col. 11, line 67. Change "an" to -- a --

Col. 19, line 62. Change "independently" to -- independent --

Col. 20, line 36. Change "an" to -- a --

Col. 21, line 59. Change "($i$ to 1)" to -- ($i$ to $\ell$) --

Col. 24, line 36. Delete "and"

Col. 30, line 25. After "the" insert -- plurality of --

Col. 30, line 28. After "the" insert -- plurality of --

UNITED STATES PATENT AND TRADEMARK OFFICE
CERTIFICATE OF CORRECTION

PATENT NO. : 5,283,632

DATED : February 1, 1994

INVENTOR(S) : Masao Suzuki

It is certified that error appears in the above-indentified patent and that said Letters Patent is hereby corrected as shown below:

```
Column 20, line 36, change "an" to --a --.
Column 21, line 59, change "( to 1)" to -- ( to ) --.
Column 24, line 36, Delete "and"
Column 30, line 25, After "the" insert -- plurality of --.
Column 30, line 28, After "the" insert --plurality of --.
```

Signed and Sealed this

Twenty-sixth Day of July, 1994

BRUCE LEHMAN

Attest:

Attesting Officer    Commissioner of Patents and Trademarks